United States Patent
Roach et al.

(10) Patent No.: US 11,511,166 B1
(45) Date of Patent: Nov. 29, 2022

(54) STRUCTURED FACE FOR GOLF CLUB HEAD

(71) Applicant: Cobra Golf Incorporated, Carlsbad, CA (US)

(72) Inventors: Ryan L. Roach, Carlsbad, CA (US); Cameron J. Day, Vista, CA (US); D. Clayton Evans, San Marcos, CA (US); Steven M. Mitzel, San Marcos, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 0 days.

(21) Appl. No.: 16/883,789

(22) Filed: May 26, 2020

Related U.S. Application Data

(63) Continuation of application No. 16/115,759, filed on Aug. 29, 2018, now abandoned.

(60) Provisional application No. 62/586,512, filed on Nov. 15, 2017.

(51) Int. Cl.
*A63B 53/04* (2015.01)

(52) U.S. Cl.
CPC .......... *A63B 53/04* (2013.01); *A63B 53/0408* (2020.08); *A63B 53/0445* (2020.08)

(58) Field of Classification Search
CPC .. A63B 53/04; A63B 53/0445; A63B 53/0408
See application file for complete search history.

(56) References Cited

U.S. PATENT DOCUMENTS

| | | |
|---|---|---|
| 2,797,201 A | 6/1957 | Franklin |
| 2,880,002 A | 3/1959 | Wetty |
| 3,455,558 A | 7/1969 | Onions |
| 3,591,183 A | 7/1971 | Ford |
| 3,698,239 A | 10/1972 | Everett |
| 3,716,347 A | 2/1973 | Bergstrom |
| 3,814,437 A | 6/1974 | Winquist |
| 3,941,390 A | 3/1976 | Hussey |
| 3,961,909 A | 6/1976 | Shapiro |
| 4,162,794 A | 7/1979 | Thompson |
| 4,204,684 A | 5/1980 | Molitor |
| 4,261,566 A | 4/1981 | MacDougall |
| 4,331,477 A | 5/1982 | Kubo et al. |

(Continued)

OTHER PUBLICATIONS

Inside Metal Additive Manufacturing, https://www.insidemetaladditivemanufacturing.com/blog/-functionally-graded-materials-using-additive-manufacturing-to-design-and-tailor-metal-properties, Jul. 2015.*
U.S. Appl. No. 16/115,759, filed Aug. 29, 2018, Pending.

*Primary Examiner* — William M Pierce
(74) *Attorney, Agent, or Firm* — Quarles & Brady LLP

(57) ABSTRACT

Summary
A golf club face member is made by a manufacturing process, such as 3D printing, for a complex topology that is sturdy with good CT. 3D printing creates a face in which struts, a lattice-like structure, a waffle-iron pattern, or interior voids provide great strength and low mass. A golf club head has a club head body defining a heel portion and a toe portion and a hosel extending upward from the heel portion when the club head is at address. A face member is disposed between the heel portion and the toe portion such that it faces forward when the club head is at address. At least portion of the face member comprises a 3D printed material such as a 3D printed or sintered metal.

15 Claims, 20 Drawing Sheets

(56) References Cited

U.S. PATENT DOCUMENTS

| | | |
|---|---|---|
| 4,710,223 A | 12/1987 | Matejczyk |
| 4,784,690 A | 11/1988 | Mullendore |
| 4,851,042 A | 7/1989 | Bose et al. |
| 4,863,538 A | 9/1989 | Deckard |
| 4,877,249 A | 10/1989 | Thompson |
| 4,938,816 A | 7/1990 | Beaman et al. |
| 4,992,236 A | 2/1991 | Shira |
| 5,062,638 A | 11/1991 | Shira |
| 5,154,425 A | 10/1992 | Niskanen et al. |
| 5,222,542 A | 6/1993 | Burke |
| 5,260,009 A | 11/1993 | Penn |
| 5,324,031 A | 6/1994 | Green |
| 5,351,952 A | 10/1994 | Hackman |
| 5,441,256 A | 8/1995 | Hackman |
| 5,441,695 A | 8/1995 | Gladden |
| 5,469,627 A | 11/1995 | Denny et al. |
| 5,591,091 A | 1/1997 | Hackman |
| 5,665,014 A | 9/1997 | Sanford et al. |
| 5,669,825 A | 9/1997 | Shira |
| 5,766,091 A | 6/1998 | Humphrey et al. |
| 5,800,632 A | 9/1998 | Arao et al. |
| 5,911,636 A | 6/1999 | Schmoll |
| 5,938,543 A | 8/1999 | McGeeney et al. |
| 5,985,208 A | 11/1999 | Zedalis et al. |
| 6,089,070 A | 7/2000 | Hancock et al. |
| 6,099,414 A | 8/2000 | Kusano et al. |
| 6,117,204 A | 9/2000 | Saito et al. |
| 6,122,564 A | 9/2000 | Koch et al. |
| 6,149,534 A | 11/2000 | Peters et al. |
| 6,261,329 B1 | 7/2001 | Ogata et al. |
| 6,322,746 B1 | 11/2001 | LaSalle et al. |
| 6,364,788 B1 | 4/2002 | Helmstetter et al. |
| 6,410,160 B1 | 6/2002 | Landin et al. |
| 6,440,010 B1 | 8/2002 | Deshmukh |
| 6,478,842 B1 | 11/2002 | Gressel et al. |
| 6,508,978 B1 | 1/2003 | Deshmukh |
| 6,692,378 B2 | 2/2004 | Shmoldas et al. |
| 6,719,648 B1 | 4/2004 | Smith |
| 6,723,278 B1 | 4/2004 | Lu et al. |
| 6,723,279 B1 | 4/2004 | Withers et al. |
| 6,737,017 B2 | 5/2004 | Woodfield et al. |
| 6,878,074 B2 | 4/2005 | Byrne et al. |
| 6,884,486 B2 | 4/2005 | Estrin et al. |
| 6,926,616 B1 * | 8/2005 | Kusumoto ......... A63B 53/0466 473/305 |
| 6,966,843 B2 | 11/2005 | Rankin |
| 7,041,014 B2 | 5/2006 | Wright et al. |
| 7,108,613 B1 | 9/2006 | Gordon et al. |
| 7,153,215 B2 | 12/2006 | Peterson et al. |
| 7,156,974 B2 | 1/2007 | Strezov et al. |
| 7,172,519 B2 | 2/2007 | Bryne et al. |
| 7,223,179 B2 | 5/2007 | Tsunoda |
| 7,229,362 B2 | 6/2007 | Tavares |
| 7,273,427 B2 | 9/2007 | Inoue et al. |
| 7,409,353 B1 | 8/2008 | Uslontsev et al. |
| 7,455,599 B2 | 11/2008 | Jones |
| 7,481,720 B2 | 1/2009 | Tavares |
| 7,628,713 B2 | 12/2009 | Tavares |
| 7,651,403 B2 | 1/2010 | Yamamoto et al. |
| 7,765,022 B2 | 7/2010 | Mazumder et al. |
| 7,775,906 B2 | 8/2010 | Kusumoto |
| 7,785,218 B2 | 8/2010 | Burnett et al. |
| 7,887,440 B2 | 2/2011 | Wright et al. |
| 7,993,216 B2 | 8/2011 | Lee |
| 8,007,373 B2 | 8/2011 | Soracco et al. |
| 8,012,041 B2 * | 9/2011 | Gibbs ................... A63B 53/02 473/345 |
| 8,012,045 B2 | 9/2011 | Turner |
| 8,070,623 B2 * | 12/2011 | Stites ................ A63B 53/0466 473/346 |
| 8,075,421 B2 | 12/2011 | Hirano |
| 8,226,498 B2 * | 7/2012 | Stites .................... A63B 53/04 473/346 |
| 8,323,122 B2 | 12/2012 | Soracco et al. |
| 8,808,107 B2 * | 8/2014 | Abe ...................... A63B 53/10 473/345 |
| 8,961,336 B1 | 2/2015 | Parsons et al. |
| 9,138,622 B1 | 9/2015 | DeMille et al. |
| 9,162,115 B1 | 10/2015 | Beach et al. |
| 9,168,435 B1 | 10/2015 | Boggs et al. |
| 9,328,660 B2 | 5/2016 | Maslov |
| 9,330,406 B2 | 5/2016 | Soracco et al. |
| 9,827,469 B1 | 11/2017 | Seluga et al. |
| 9,914,030 B2 | 3/2018 | Cleghorn et al. |
| 10,322,320 B2 | 6/2019 | Morales et al. |
| 2001/0001774 A1 | 5/2001 | Antonious |
| 2002/0019265 A1 | 2/2002 | Allen |
| 2002/0059049 A1 | 5/2002 | Bradbury et al. |
| 2002/0091014 A1 | 7/2002 | Aldrich |
| 2003/0013542 A1 | 1/2003 | Burnett et al. |
| 2003/0060306 A1 | 3/2003 | Aldrich |
| 2003/0176231 A1 | 9/2003 | Hasebe |
| 2003/0203764 A1 | 10/2003 | Dabbs et al. |
| 2003/0221347 A1 | 12/2003 | Peterson et al. |
| 2004/0082404 A1 | 4/2004 | Willett et al. |
| 2004/0146736 A1 * | 7/2004 | Ivanov .................. C22C 1/0491 428/609 |
| 2004/0204257 A1 | 10/2004 | Boscha et al. |
| 2004/0235582 A1 | 11/2004 | Solheim et al. |
| 2005/0037861 A1 | 2/2005 | Kobayashi |
| 2006/0052181 A1 | 3/2006 | Serrano et al. |
| 2006/0129462 A1 | 6/2006 | Pankl et al. |
| 2008/0026891 A1 | 1/2008 | Oseto |
| 2008/0076595 A1 | 3/2008 | Lai et al. |
| 2008/0119303 A1 | 5/2008 | Bennett et al. |
| 2008/0235934 A1 | 10/2008 | Burnett et al. |
| 2008/0318705 A1 | 12/2008 | Clausen et al. |
| 2010/0009771 A1 | 1/2010 | Newcomer |
| 2010/0130303 A1 | 5/2010 | Stites |
| 2010/0227704 A1 | 9/2010 | Souza |
| 2010/0267461 A1 | 10/2010 | Stites |
| 2010/0267463 A1 | 10/2010 | Stites |
| 2010/0298065 A1 * | 11/2010 | Soracco ................ A63B 60/00 473/349 |
| 2011/0053703 A1 | 3/2011 | Stites et al. |
| 2011/0124432 A1 | 5/2011 | Oldknow et al. |
| 2011/0207551 A1 | 8/2011 | Breier et al. |
| 2011/0312437 A1 | 12/2011 | Sargent et al. |
| 2012/0165115 A1 | 6/2012 | Matsunaga |
| 2012/0178550 A1 * | 7/2012 | Solheim ................ A63B 60/52 473/346 |
| 2012/0289360 A1 | 11/2012 | Breier et al. |
| 2013/0045334 A1 * | 2/2013 | Seals .................... B23K 35/327 427/446 |
| 2013/0331201 A1 | 12/2013 | Wahl et al. |
| 2013/0344990 A1 | 12/2013 | Slaughter et al. |
| 2014/0080634 A1 | 3/2014 | Golden et al. |
| 2014/0187346 A1 | 7/2014 | Beno et al. |
| 2014/0256463 A1 | 9/2014 | Knight |
| 2014/0274458 A1 * | 9/2014 | Kronenberg ........... A63B 60/46 473/342 |
| 2014/0274459 A1 * | 9/2014 | Kronenberg ......... A63B 53/047 473/342 |
| 2015/0094166 A1 | 4/2015 | Taylor et al. |
| 2015/0231454 A1 | 8/2015 | Parsons et al. |
| 2015/0231806 A1 | 8/2015 | Parsons et al. |
| 2015/0343278 A1 | 12/2015 | Franklin et al. |
| 2015/0367198 A1 | 12/2015 | Seagram |
| 2016/0096082 A1 | 4/2016 | Boggs et al. |
| 2016/0193508 A1 | 7/2016 | Issertell et al. |
| 2016/0250534 A1 | 9/2016 | Solheim et al. |
| 2016/0263449 A1 * | 9/2016 | Morales ............... B23K 20/021 |
| 2016/0310809 A1 | 10/2016 | Boggs |
| 2016/0317880 A1 | 11/2016 | Boggs |
| 2016/0346644 A1 | 12/2016 | Larsen et al. |
| 2016/0367876 A1 | 12/2016 | Taylor et al. |
| 2017/0028270 A1 | 2/2017 | Westrum |
| 2017/0072277 A1 | 3/2017 | Mata et al. |
| 2017/0100649 A1 | 4/2017 | Seluga et al. |
| 2017/0173417 A1 | 6/2017 | Seluga et al. |
| 2017/0182381 A1 | 6/2017 | Seluga et al. |
| 2018/0028879 A1 | 2/2018 | Ines et al. |
| 2018/0028882 A1 | 2/2018 | Hebreo et al. |

(56) References Cited

U.S. PATENT DOCUMENTS

| | | |
|---|---|---|
| 2018/0253774 A1 | 9/2018 | Soracco et al. |
| 2019/0091524 A1 | 3/2019 | Slaughter et al. |
| 2019/0168087 A1 | 6/2019 | Martens et al. |
| 2019/0175995 A1* | 6/2019 | Kroloff .................. A63B 53/04 |
| 2019/0175996 A1* | 6/2019 | Kroloff .............. A63B 53/0487 |
| 2019/0255394 A1 | 8/2019 | Boggs et al. |
| 2019/0275382 A1 | 9/2019 | Boggs et al. |
| 2019/0275387 A1 | 9/2019 | Morales et al. |
| 2020/0086386 A1* | 3/2020 | Koehler .................. B22F 3/105 |
| 2021/0077865 A1* | 3/2021 | Morales ................... B32B 3/12 |

* cited by examiner

STRUCTURED FACE FOR GOLF CLUB HEAD

CROSS-REFERENCE TO RELATED APPLICATIONS

This application claims the benefit of U.S. Provisional Patent Application No. 62/586,512, filed Nov. 15, 2017, incorporated by reference.

TECHNICAL FIELD

The invention relates to golf clubs.

BACKGROUND

The ball-striking face of a golf club head has spring-like properties that aid in hitting a golf ball a great distance. When a golf club strikes a ball, energy transferred into the club face deforms the club face, which then springs back, propelling the ball forwards. The governing bodies of golf, the USGA and the R&A, have set limits on how spring-like the face of a golf club can be. The spring-like effects of a face can be measured as a coefficient of restitution, where a value of 1 would indicate an ideal spring. To facilitate standardized measurement and testing, the governing bodies provide for the testing of characteristic time (CT) as a proxy for coefficient of restitution. CT is measured using a testing apparatus that simulates striking a golf ball and measures the duration for which a simulated golf ball is in contact with the face. The nominal limit of CT for drivers is set by the governing bodies at 238 milliseconds.

Golf club designers may seek to design a driver with the highest permissible CT, to offer golfers a driver with a "hot face", a driver that sends the ball a great distance. To maximize the CT, the designer will make the face as thin as possible to create, in effect, a springy metal face. However, making a face very thin may compromise its durability. For durability, the designer may provide the face with a thicker pad geometry in the center of the face, to reinforce the face in the areas where it will repeatedly impact a golf ball. However, a thick mass of metal on the back of a club face is not the ideal location of mass with respect to other mass distribution properties of a club head, such as its rotational moment of inertia or location of center of gravity. For example, for very long drives, it may be preferable to locate a club head gravity as low, and as far back from the face, as possible.

SUMMARY

The invention provides a golf club face member made by a subtractive or additive manufacturing process, such as 3D printing, which allows the face to have a complex topology to make it very sturdy while also having a very high CT. A process such as 3D printing can create a face in which a complex network of struts or a lattice-like structure provides great strength with a very lightweight structure. The face member can be structured to include internal voids, a lattice, struts, or any other suitably reinforced structure that is otherwise difficult or impossible to mold or cast. 3D printing technologies of the disclosure allow a golf club ball-striking face to be made with metal materials and non-metal materials, and further used in the manufacture of a golf club head. Due to its complex geometry, a 3D printed face member of the disclosure is lighter and/or stronger than a prior art ball-striking face. Since the face member can be 3D printed with metal materials, such as stainless steel, aluminum, titanium, or metal blends, as well as non-metal materials, such as carbon and plastics, the face member can be welded into a club head body member to be joined with any other pieces and subjected to finishing such as painting to provide a finished club head for installation on a shaft to make a golf club. Also, since the 3D printed face can have variable material density and composition throughout the face, such as a different material on the face perimeter as compared to the face center, the designer is better able to selectively optimize the face design.

Additionally, 3D printing is a technology that allows for seamless transitions from one material to another. Thus a face member of the disclosure may include a first material in one portion (e.g., titanium), and a second material in another portion (e.g., composite), and a zone of seamless transition from the first material to the second material.

In certain aspects, the invention provides a golf club head in which at least a portion of a ball-striking face is 3D printed. The golf club head has a club head body defining a heel portion and a toe portion and a hosel extending upward from the heel portion when the club head is at address. A face member is disposed between the heel portion and the toe portion such that it faces forward when the club head is at address. At least a portion of the face member comprises a 3D printed material. For example, in some embodiments, the face member may be constructed, via 3D printing, from a single material (i.e., a single metal or a single non-metal material). It should be noted, however, that in other embodiments, portions of the face member may be constructed from different materials, such that a first portion of the face member may comprise a metal material and a second portion of the face member may comprise a non-metal material, such that the face member, which has been 3D printed, is partially metallic and partially non-metallic.

In some embodiments, the 3D printed material defines a post extending from a first point on the face member to a second point on the face member, in which part of the post is spaced away from a surface of the face member. The post may extend across a recess depressed into a surface of the face member. Optionally, the club head includes a plurality of posts extending across the recess. The plurality of posts may crisscross each other when viewed from a vantage normal to an inside surface of the face member. The recess is preferably located on an inside surface of the face member and may optionally be biased towards a toe-end of the face member. The face member may further comprise a second recess on the inside surface and biased towards a heel-end of the face member.

In certain embodiments, the ball-striking face further comprises at least one void space within the 3D printed material. The 3D printed material may define a complete and seamless enclosure of the void space. In some embodiments, the void space is disposed between a front wall and a back wall of the ball-striking face, and the ball-striking face further includes one or more posts that extend across the void space from the front wall to the back wall. Optionally, the ball-striking face includes a plurality of posts of differing cross-sectional thicknesses. For example, the face may include at least one central post near a center of the ball-striking face that is more than twice as thick as at least peripheral post across the void space. Preferably, the 3D printed material fully encloses the void space, leaving no fluid communication between the void space and an exterior of the golf club head. As previously described, the 3D printed ball-striking face may be constructed from both metal and non-metal materials. For example, in one embodiment, the plurality of posts may be constructed from a non-metal material, such as nylon, for example, while the remainder of the ball-striking face may be constructed from a metal material.

In some embodiments, the portion of the face member comprising the 3D printed material presents a surface comprising a network of raised lineaments defining a plurality of recesses. The raised lineaments may define a rectilinear grid such as a pattern of relief or a waffle iron pattern. In certain embodiments, the raised lineaments define a portion of a geodesic polyhedron or a plurality of triangles.

DETAILED DESCRIPTION

Figure 1:
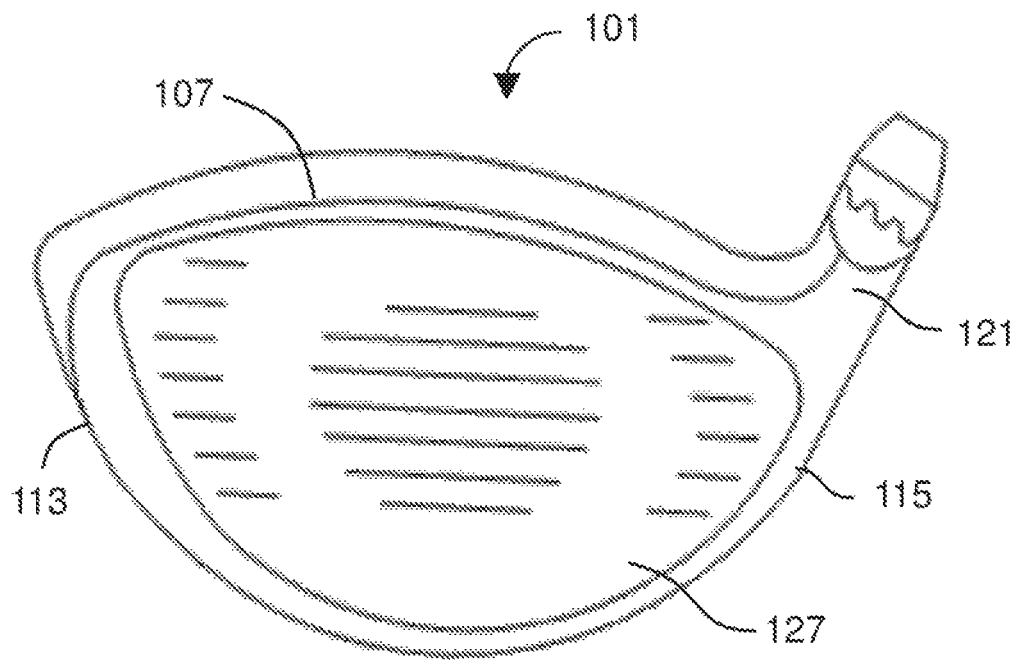
FIG. 1 shows a golf club head with a 3D printed face member.

The invention provides a golf club head in which a portion of the ball-striking face is made by a subtractive or additive manufacturing process such as computer-numeric controlled (CNC) machining, fused filament fabrication (FFF), direct metal laser sintering (DMLS), atomic diffusion additive manufacturing (ADAM), and/or cold spray additive manufacturing (CSAM). Such 3D printing and related methods are useful for making openwork structures, ribs, trusses, internal voids or pockets, and other complex forms and topologies to provide strength and stiffening at key points of the face while minimizing mass. Because the ball-striking face includes strengthening and reinforcing elements it provides, for its mass, great strength and a highly desirable characteristic time. Because mass is saved, the club head can be significantly reinforced and structurally improved without significant increases in mass and discretionary mass is "freed up", allowing the club head designer to locate mass of the club head distal from a vertical axis, thereby increasing moment of inertia about the vertical axis, or low and to the back of the club head. Because the club head has a high moment of inertia, it is forgiving to off-center hits. Because the ball-striking face is structurally reinforced and exhibits a high characteristic time, the club head can strike balls with great speed without compromise to its material integrity, and thus can make very long shots without subjecting the ball-striking face to fatigue or breakage. Because the club head is forgiving and achieves great distance, it will provide playing satisfaction to a great variety of golfers, golfers with diverse playing strengths and skills.

The invention provides a golf club face member made by a subtractive or additive manufacturing process, such as 3D printing, which allows the face to have a complex topology to make it very sturdy while also having a very high CT. A process such as 3D printing can create a face in which a complex network of struts or a lattice-like structure provides great strength with a very lightweight structure. The face member can be structured to include internal voids, a lattice, struts, or any other suitably reinforced structure that is otherwise difficult or impossible to mold or cast. 3D printing technologies of the disclosure allow a golf club ball-striking face to be made with metal materials and non-metal materials, and further used in the manufacture of a golf club head. Due to its complex geometry, a 3D printed face member of the disclosure is lighter and/or stronger than a prior art ball-striking face. Since the face member can be 3D printed with metal materials, such as stainless steel, aluminum, titanium, or metal blends, as well as non-metal materials, such as carbon and plastics, the face member can be welded into a club head body member to be joined with any other pieces and subjected to finishing such as painting to provide a finished club head for installation on a shaft to make a golf club. Also, since the 3D printed face can have variable material density and composition throughout the face, such as a different material on the face perimeter as compared to the face center, the designer is better able to selectively optimize the face design.

In certain aspects, the invention provides a golf club head in which at least a portion of a ball-striking face is 3D printed. The golf club head has a club head body defining a heel portion and a toe portion and a hosel extending upward from the heel portion when the club head is at address. A face member is disposed between the heel portion and the toe portion such that it faces forward when the club head is at address. At least a portion of the face member comprises a 3D printed material. For example, in some embodiments, the face member may be constructed, via 3D printing, from a single material (i.e., a single metal or a single non-metal material). It should be noted, however, that in other embodiments, portions of the face member may be constructed from different materials, such that a first portion of the face member may comprise a metal material and a second portion of the face member may comprise a non-metal material, such that the face member, which has been 3D printed, is partially metallic and partially non-metallic.

FIG. 1 shows a golf club head 101 with a 3D printed face member. The club head 101 includes a club head body 107 defining a toe portion 113 and a heel portion 115. A hosel 121 extends upward from the heel portion 115 when the club head 101 is at address. The club head 101 further includes a face member 127 and a portion of the face member is made via a subtractive or additive manufacturing technique such as CNC machining, FFF, DMLS, or ADAM and most preferably made via a 3D printing technique such as DMLS or ADAM.

Additionally, or alternatively, the portion of the face member may be made via cold spray additive manufacturing (CSAM) techniques. More specifically, CSAM is a solid-state coating deposition technology, which generally involves the deposition of a powder material onto a substrate using pressurized gas, typically at supersonic speeds, wherein the gas used, primarily nitrogen or helium, is at high pressure and temperature (e.g., up to 70 bar and 1100° C.). In comparison with fusion-based high-temperature additive manufacturing processes, CSAM has the ability to retain the original properties of the feedstock (i.e., the powder material), to produce oxide-free deposits, and to not adversely influence underlying substrate materials during manufacture of the face member 127, including the portion of the face member constructed via CSAM. As understood, CSAM includes the term "cold" in reference to the fact that the powder materials used are not melted, but instead rely on high velocity deposition to thereby cause the powder materials to plasticize on impact, thereby forming a solid-state metallurgical bond with the substrate. Accordingly, CSAM techniques may be used to form the face member 127 or portions thereof.

For example, CSAM may be used to allow for dissimilar materials of a golf club head consistent with the present disclosure to be bonded, or otherwise, coupled together. For example, CSAM may be used to bond different metals to one another, including the bonding of any combination of the following metals including, but not limited to, titanium, steel, aluminum, nickel, and nickel-chromium.

For example, in one embodiment, a first metal by be applied, via CSAM, to at least one side of a ball-striking face plate of a second metal. In some instances, the first metal may be applied to both sides of the ball-striking face plate. Yet still, in some embodiments, the first metal may completely encapsulate the ball-striking face plate. Furthermore, CSAM may be used to bond metal and non-metal materials to one another. For example, in one embodiment, CSAM may be used to bond a metal onto a non-metal surface, such as a composite or plastic panel of a golf club head (e.g., a composite plate with a steel or titanium applied on one side, serving as a wear surface).

In each case, the use of CSAM techniques for the construction of a ball-striking face, as well as construction of the golf club head itself, may reduce the overall ball-striking face weight (and the golf club head weight) and/or improve the feel and/or ball speed due to increase in face deflection. Furthermore, CSAM methods may be used for placement of a particular material at a particular portion of a portion of the golf club head to allow for bonding of portions of the golf club head to one another, wherein such portions would otherwise fail to be coupled to another. For example, in the event that a ball-striking face plate comprises a first metal that is otherwise unable to be welded to the golf club head body (i.e., the body and ball-striking face have dissimilar materials), CSAM may be used to deposit a metal upon the ball-striking face plate (e.g., along a perimeter of the plate), wherein such metal is compatible with the club head body material and allows for welding of the ball-striking face plate to the club head body.

Figure 2:
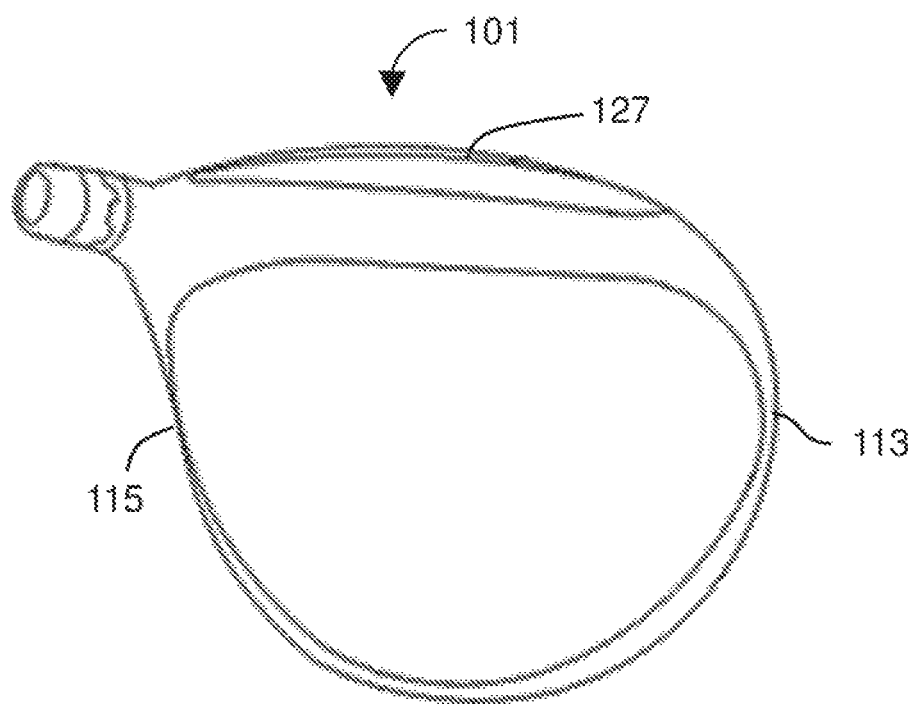
FIG. 2 shows the 3D printed face member.

FIG. 2 shows the 3D printed face member 127 disposed between the heel portion 115 and the toe portion 113 and facing forward when the club head is at address, wherein at least portion of the face member comprises a 3D printed material.

Figure 3:
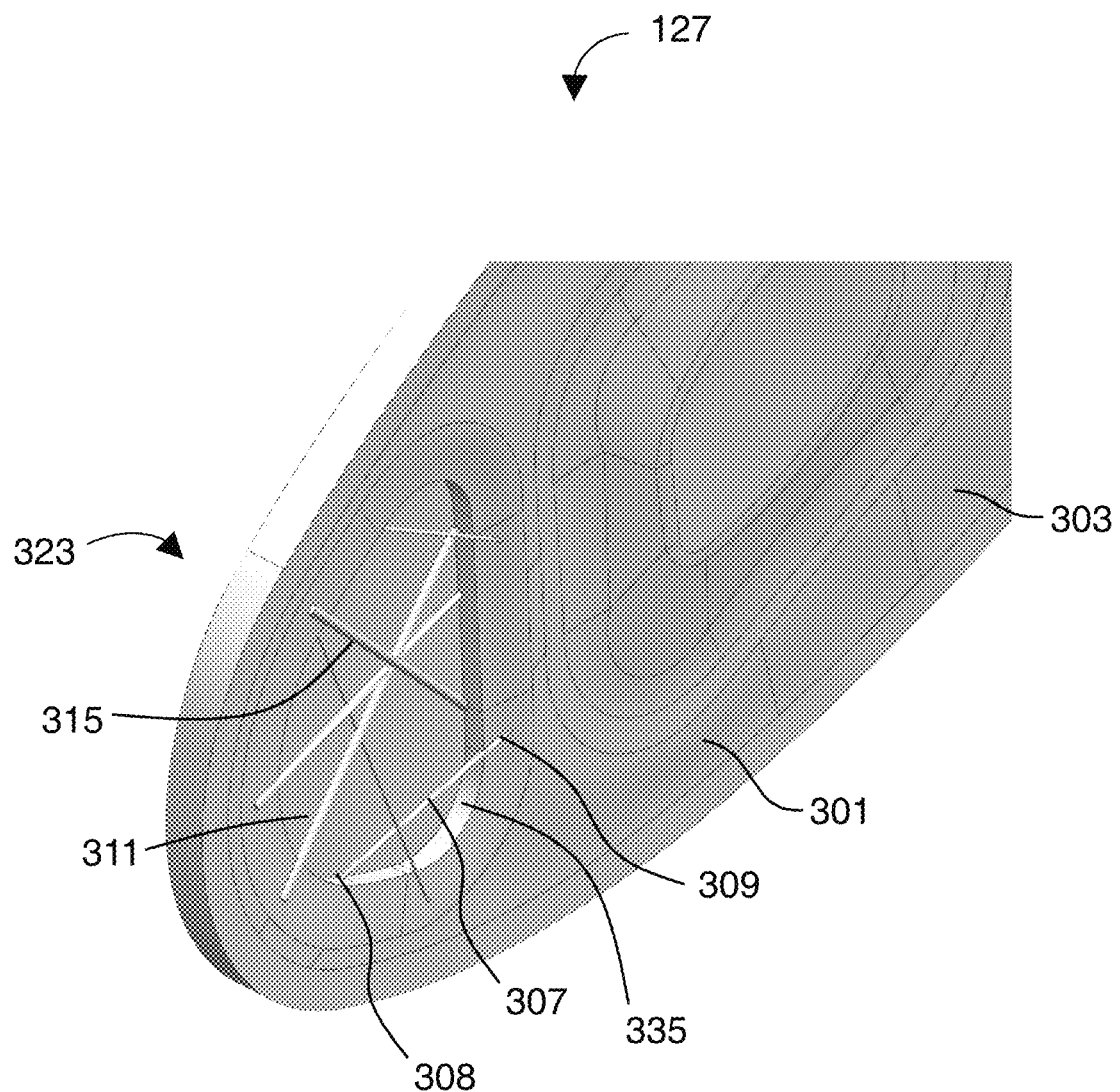
FIG. 3 shows an interior surface of the 3D printed face member.

FIG. 3 shows a back side, or interior surface 303, of the 3D printed face member 127. Some or all of the face member 127 comprises a 3D printed material. In the depicted embodiments, the 3D printed material 301 defines a post 307 extending from a first point 308 on the face member to a second point 309 on the face member, wherein at least a portion of the post 307 is spaced away from a surface of the face member. Thus it can be seen that the post 307 extends across a recess 335 depressed into the interior surface 303 of the face member. As shown, the face member 127 further includes a second post 311, a third post 315, as well as any other number of posts to provide a plurality of posts 323 extending across the recess 307. The plurality of posts 323 may crisscross each other when viewed from a vantage normal to the inside surface 303 of the face member 127. The complex geometry of the plurality of posts can be provided by fashioning the face member 127 using a subtractive or additive manufacturing technology such as 3D printing of a metal material, such as stainless steel, aluminum, titanium, or metal blends, as well as non-metal materials, such as carbon and plastics, including, for example, nylon.

Using subtractive or additive manufacturing allows a golf club to include complex geometries and forms such as lattice structures, tubes, or material bridges crisscrossing a voided volume of the face insert where it would typically be solid. The recess 335 is located on an inside surface of the face member and biased towards a toe-end of the face member 127. Preferably, the face member further comprises a second recess on the inside surface and biased towards a heel-end of the face member.

In preferred embodiments, the 3D printed material 301 comprises a metal that is formed by an additive manufacturing process such as fused filament fabrication (FFF), direct metal laser sintering, or atomic diffusion additive manufacturing.

Fused filament fabrication (FFF) is an additive manufacturing technology useful for modeling, prototyping, and production applications. It is one of the techniques of 3D printing. FFF works on an additive principle by laying down material in layers; a filament or wire is unwound from a coil and supplies material to produce a part. FFF is also sometimes called fused deposition modeling (FDM) or plastic jet printing (PiP). FFF begins with a software process which processes a file in the stereo lithography file format(*.stl), mathematically slicing and orienting the model for the build process. The part is produced by extruding small flattened strings of molten material to form layers as the material hardens immediately after extrusion from the nozzle. A filament is unwound from a coil and supplies material to an extrusion nozzle which can turn the flow on and off. There is typically an accurately controlled drive that pushes the filament into the nozzle. The nozzle is heated to melt the material. The materials are then deposited by an extrusion head.

The nozzle can be moved in both horizontal and vertical directions by a numerically controlled mechanism. The nozzle follows a tool-path controlled by a computer-aided manufacturing (CAM) software package, and the part is built, one layer at a time. Stepper motors or servo motors are typically employed to move the extrusion head. The mechanism used is often an X-Y-Z rectilinear design, although other approaches may be employed. FFF is compatible with a variety of materials including, for example, Acrylonitrile Butadiene Styrene (ABS), Polylactic acid (PLA), Polycarbonate (PC), Polyamide (PA), Polystyrene (PS), lignin, rubber, PEEK, and metals. To print metal via FFF, one may use the metal filaments sold under the trademark FILAMET by Virtual Foundry (Stoughton, Wis.). Metal filament may be used to print almost entirely metallic objects directly from 3D printers.

Embodiments of the invention make use of sintering for the additive manufacturing of metal parts and non-metal parts. Metal sintering and related processes offer an alternative to off-the-shelf club heads. Powdered metal sintering systems involve a bed of metal powder that is sintered or melted layer by layer by a laser or electron beam to create metal parts. After the part has been created, the surrounding powder can be brushed away or shaken out of the part. In addition, a variety of metal powders can be melted in these systems. Metal sintering processes typically require the input of 3-D CAD files and filling a dispenser with the desired powdered starting materials. A control program converts the CAD files into instructions for controlling the layer by layer formation of the metal parts. The layer by layer formation is accomplished by laser sintering a first layer of approximately 20 to 40 micron powder onto a steel platform. The platform then lowers by approximately 20 to 80 microns, a fresh layer of powder is swept over the previously sintered layer, and the next layer is sintered or added on top of the previously built one. The additive process is repeated until the desired part is complete.

Direct metal laser sintering (DMLS), for example, is a method for manufacturing custom metal parts. DMLS uses a computer-guided laser to sinter layers of powdered metal to create the desired objects. DMLS is an "additive" technology that sinters very fine powders layer by layer from the bottom up until the product is completed. A number of commercially available systems are suitable for use in the present invention. For example, the selective laser melting system sold under the trademark MCP REALIZER by ReaLizer GmbH (Borchen, Del.) can create parts from any number of metals including the following powders: zinc, bronze, stainless steel, titanium, chromium-cobalt, silicon carbine, and aluminum oxide. Additionally EOS of Germany provides systems that rely on direct metal laser sintering (DMLS). ARCAM of Sweden produces machines that rely on electron beam melting (EBM) technology.

While slightly different in execution, metal deposition systems can also be used to make custom golf club components, especially golf club heads. Multiple heads can be incorporated into these systems to increase the production speed. Metal deposition systems are currently available from FCDBIC AB of Sweden and ProMetal, LLC of Troy, Mich. This process may be used to create a solid part with uniform or non-uniform material properties or to add layers of powdered metal to an existing substrate. For example, a metal deposition device may be employed to coat a portion of a surface of a golf club head with a material that has a high density in order to alter the center of gravity or other design specification of the golf club head.

Generally, layer by layer fabrication procedures require 3-D CAD files, which are converted to an STL (stereo lithography) file, and then the STL file instructs the machine for processing. The STL file format is widely used to describe the shape of a three dimensional object. This file format is supported by many software packages and is widely used for transferring CAD models to rapid prototyping and direct manufacturing machines. STL files are used for 3D prototyping in other media, i.e., polymers.

Another method that may be used for the additive manufacturing of metal parts is atomic diffusion additive manufacturing (ADAM). ADAM is a metal 3D printing method that can produce metal parts of excellent quality. ADAM enables the creation of metal parts with a speed and accuracy. ADAM is an industrial metal printing method that uses metal powders encased in plastic binders. When the plastic is melted off, the metal powders can be arranged in complex shapes. The plastic dissolves and the metal is sintered into a design. The ADAM process works layer by layer as metal crystals pass through the bonds of the printed layers. This allows for an entire part to created seamlessly with immense structural durability. ADAM allows for geometric complexity in metal shapes with lowered costs. ADAM can be performed by the 3D printing instrument sold under the trademark METAL X by Markforged (Watertown, Mass.). ADAM can work with a wide range of metals such as, for example, stainless steel, aluminum and titanium.

With ADAM, parts are printed, layer-by-layer, using apowder contained in a plastic binder. After printing, plastic binders are removed and the part is sintered into customary engineering metals. By sintering the entire part at once, ADAM technology allowscrystals to grow through the bonded layers, effectively erasing the layer-to-layer strength reduction of many other 3D printing processes.

It is noted that DMLS and ADAM both result in sintered metal. Sintered metal may be preferable for its uniform internal structure.

Due to the geometry by which a part is fashioned via additive manufacturing methods such as FFF, DMLS, or ADAM, parts can be used to make a golf club part that includes one or more flying struts or posts ("flying" meaning that a theoretical string could be tied around a post of the structure and thereby linked to the structure).

Furthermore, another method that may be used for constructing a ball-striking face consistent with the present disclosure is 3D printing of one or more portions of the ball-striking face from a castable wax resin designed for direct investment casting. In particular, a castable wax resin material may be used to construct portions of the ball-striking face, or the entire ball-striking face, which include a high-degree a complexity and detail not achievable by legacy casting methods. Accordingly, upon constructing the cast (from the castable wax resin via 3D printing methods), the portion of the ball-striking face (represented by the cast) can be formed via conventional casting methods. As such, at least a portion of the ball-striking face, which may include intricate detail and design, is able to be formed via a combination of 3D printing and conventional casting methods, thereby taking advantage of the benefits of additive manufacturing without the additional costs associated with 3D printing the portion of the ball-striking face directly from a metal material.

For example, a particular portion of a ball-striking face may be 3D printed from a castable wax resin, thereby creating a cast of that particular portion. The wax cast can then be coupled to a wax model of the golf club head body, for example, via wax welding, at which point, the conventional casting methods may occur, resulting in the formation of a cast golf club head and ball-striking face, which were initially designed via an additive manufacturing process. This method enables the construction of portions of a ball-striking face, or portions of the golf club head itself, that have particular designs, shapes, or features that would otherwise be difficult to achieve using conventional tooling, such as undercuts, lattice structures, and interior channels. Such designs, shapes, or features will transfer to the metal part during the casting process. Additionally, since no tooling is involved to create the printed portion of the wax cast, each of the printed waxes could be unique in design or shape—and still made into metal using the conventional lost wax process.

Figure 4:
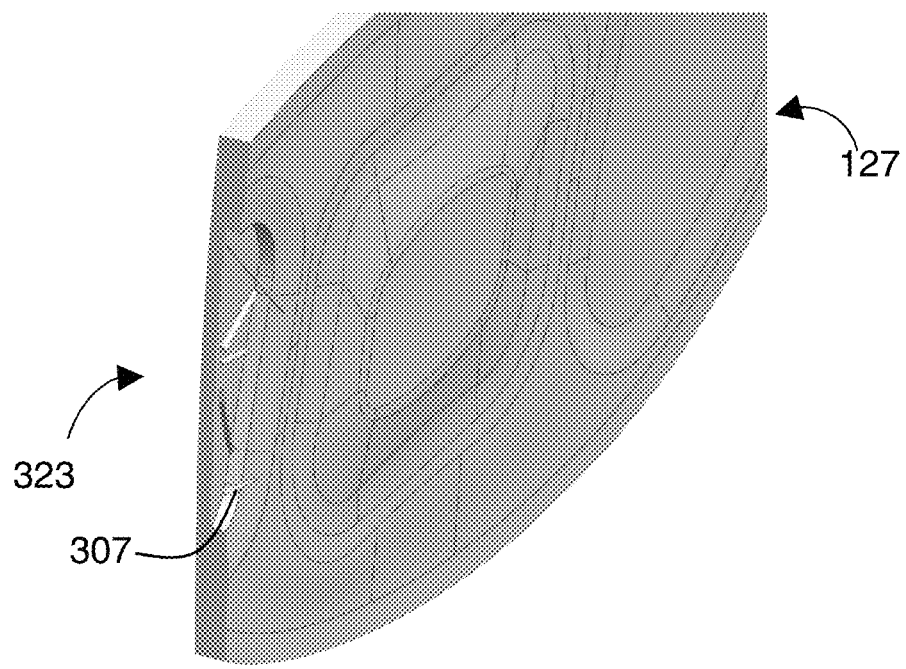
FIG. 4 is a cutaway view of the 3D printed face member showing posts therein.

FIG. 4 is a cutaway view of the 3D printed face member 127 showing the plurality of posts 323. The posts may be described as traversing a recess 335 and are spaced apart from a floor of the recess (the flooring being an inside, back surface of one of the thinnest areas of the 3D printed face member 127. Importantly, because the 3D printed face member 127 may be formed by a 3D printing process such as ADAM, the entire 3D printed face member 127 is monolithically formed, meaning there are no assembly seams or mating surfaces between different original parts. The 3D printed face member 127 is all one part with a uniform internal material composition and no, for example, weld points. The beneficial effects of monolithic formation include the avoidance of stress risers or seeds of material fatigue that may be associated with, for example, welding a post or truss to a back surface of the face (e.g., the extreme temperature of welding may differentially temper the metal just at the weld-points of those posts, some of which terminate near a central region of the face).

Figure 5:
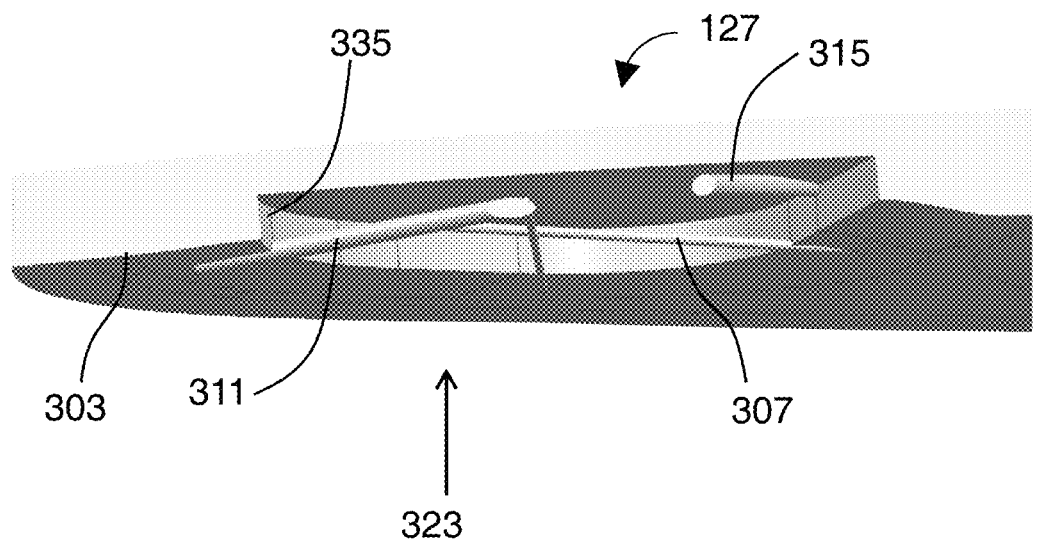
FIG. 5 is top-down cutaway view of posts in the 3D printed face member.

FIG. 5 is top-down cutaway view of the 3D printed face member 127 showing the plurality of posts 323 crisscrossing each other in space, and each spaced away from the inside surface 303 within the recess 335. The post 307, the second post 311, and the third post 315 (and optionally any number of additional posts) extend across a recess 335, which recess 335 is depressed into the interior surface 303 of the face member 127. The posts are flying in that they are spaced apart from the inside surface 303 (meaning, e.g., that a closed loop of string could be formed around any one of the posts). Alternatively, the depicted posts could be ribs or ridges, in that they could rise proud from the surface 303. However, flying posts may be the preferred embodiment for maximum weight savings and stiffness.

In the depicted embodiment, 3D printing is used to provide a plurality of posts 323 that may be spaced apart from the face member 127 to give additional strength and provide a very lightweight face member with a high CT. By including the recess with posts 323 that span the recess, it can be understood that the face member 127 has a unique topology and 3D shape compared to prior art, slab-like face members. One way to characterize the unique shape is to understand that the recess results in void spaces, or areas within the face member 127 that are void of the material 301. By providing void spaces within the face member, the face member has a lower mass than it would if it were formed by conventional molding or forging.

Using subtractive or additive manufacturing such as 3D printing can provide a face member with mass-saving voids in a variety of beneficial ways.

Figure 6:
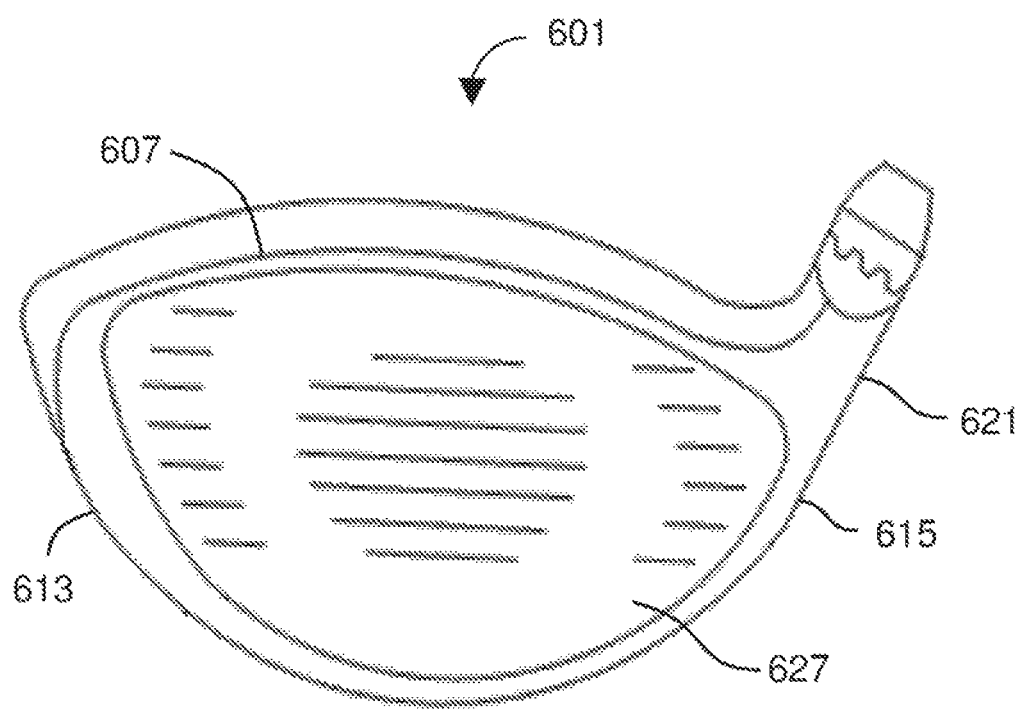
FIG. 6 shows a hollow-face golf club head.

FIG. 6 shows a hollow-face golf club head 601 that includes a face member 627 that is 3D printed and includes one or more interior void spaces or pockets that may be fully enclosed by a material of the face member 627. The hollow-face golf club head 601 has a club head body 607 defining a toe portion 613 and a heel portion 615. A hosel 621 extends upward from the heel portion 615 when the club head 601 is at address. The club head 601 further includes a face member 627. The face member 627 is disposed between the heel portion 615 and the toe portion 613 and facing forward when the club head is at address. At least a portion of the face member 627 comprises a 3D printed material.

Figure 7:
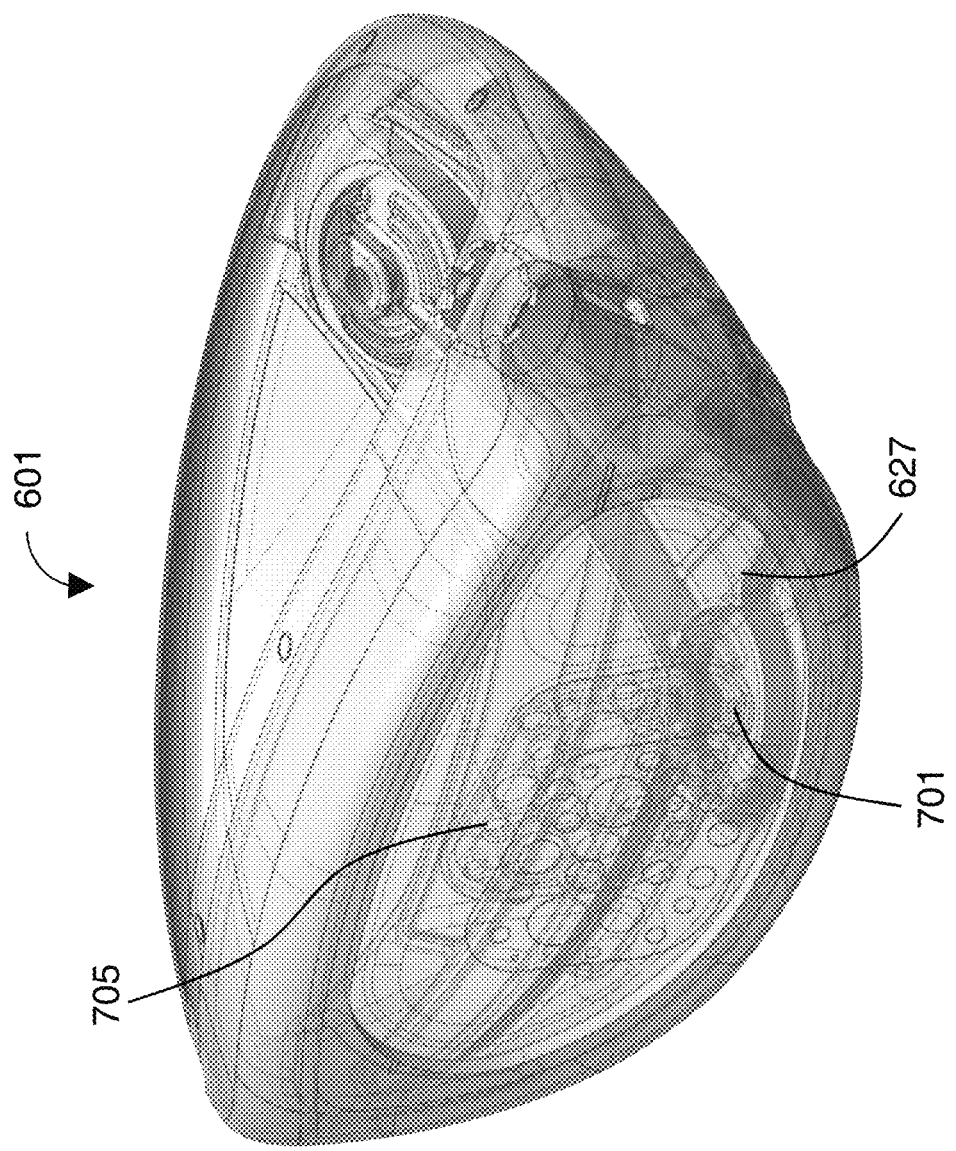
FIG. 7 is a wire-frame drawing of the hollow face club head.
Figure 8:
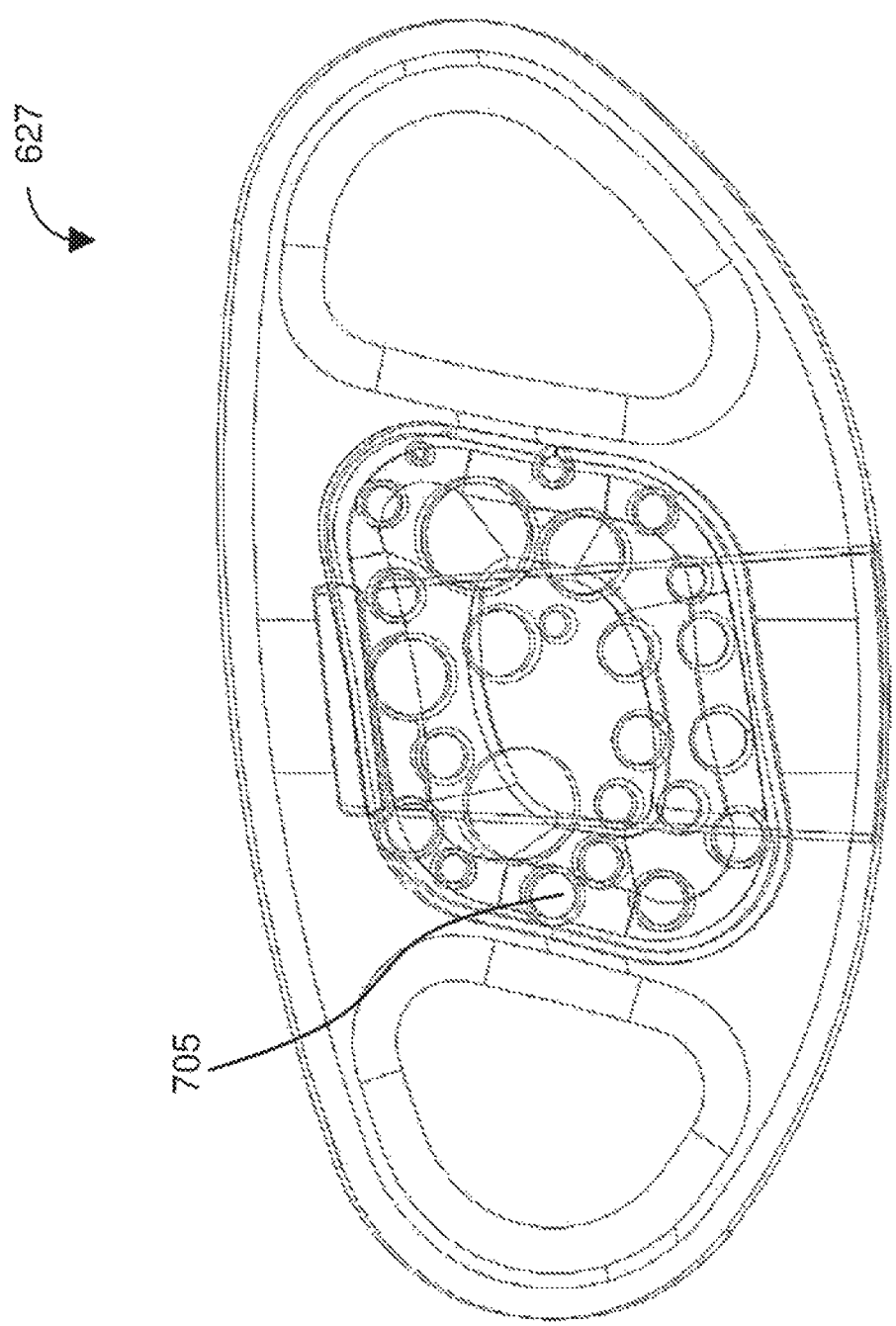
FIG. 8 is an enlarged wire-frame drawing of the face member of the hollow face club head.

FIG. 7 is a wire-frame drawing of the hollow-face club head 601 and FIG. 8 is an enlarge wire-frame drawing of the face member 627. As shown in FIGS. 7 and 8, the face member 627 includes a pocket 701 of space within the face member 627, in which the pocket 701 is crossed by a plurality of posts 705. Circles drawn in the wire frame view are internal post/structures inside the pocket 701.

Figure 9:
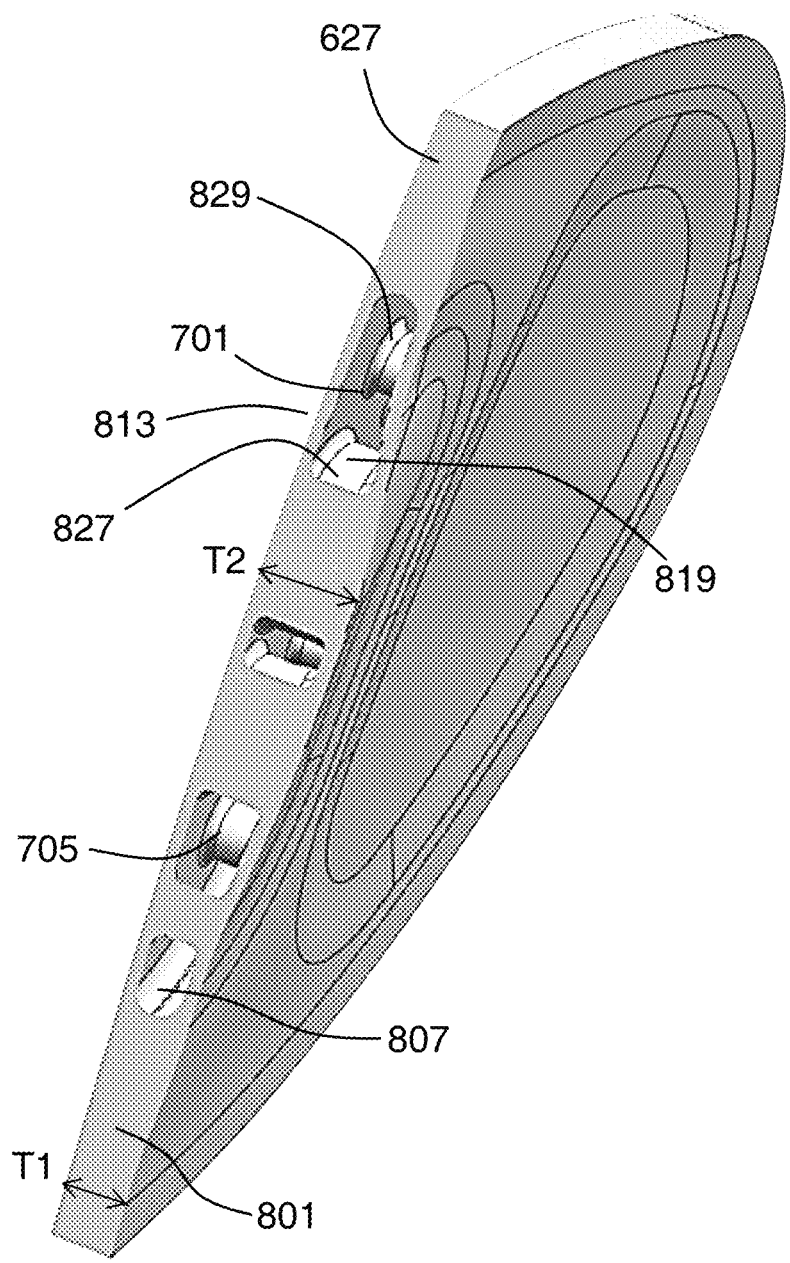
FIG. 9 is a cross-section of a face member of the hollow face club head.
Figure 10:
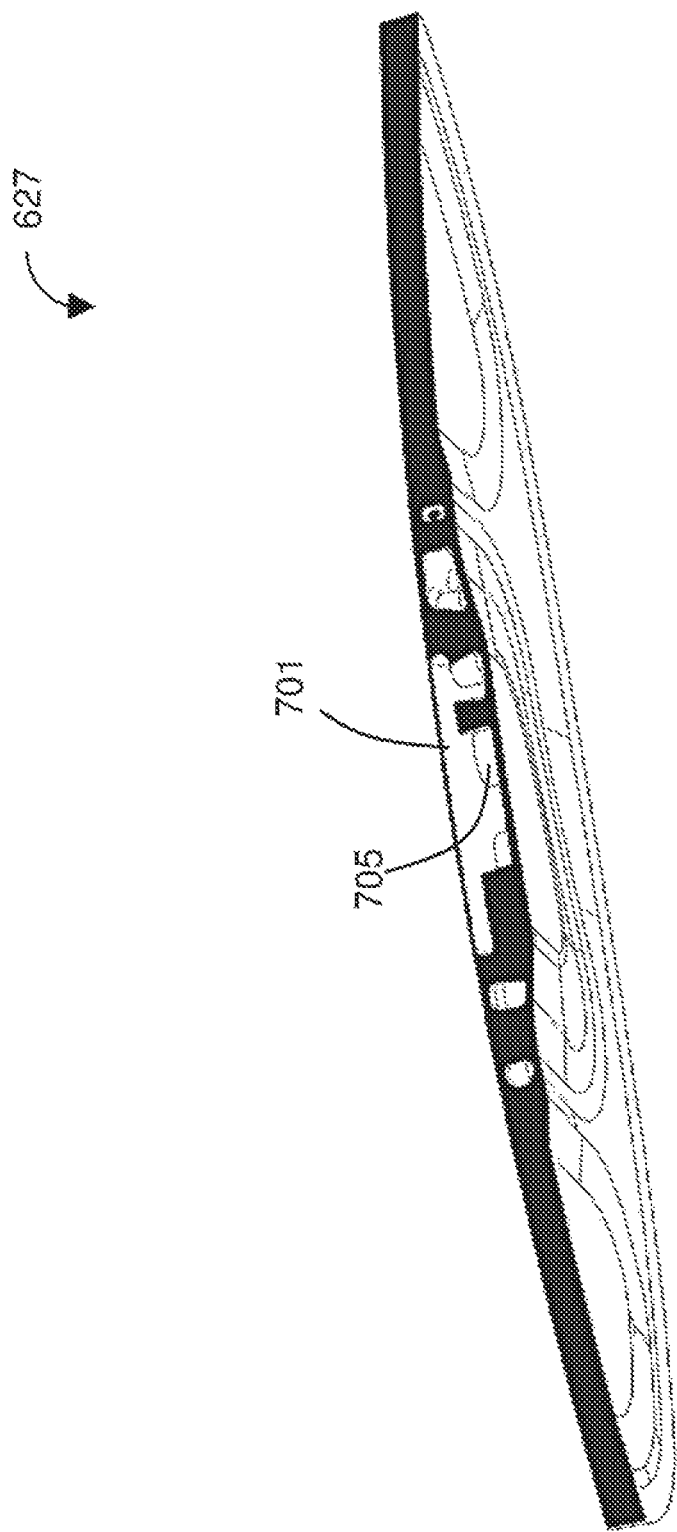
FIG. 10 is a cross-section of the face member of the hollow face club head.

FIGS. 9 and 10 are cross-sectional views of the face member 627 of the hollow-face club head 601, showing the pocket 701 crossed by a plurality of posts 705. The face member 627 is made of a material 801 and preferably contains a pocket of space within the material 801. In a preferred embodiment, the material 801 is a metal or alloy that includes, for example, stainless steel, titanium, or aluminum.

Due to the pocket 701, the ball-striking face includes void space 807 within the 3D printed material. The pocket 701, traversed by the posts 705, could not be formed by traditional casting or stamping constructions. Here, additive or subtractive manufacturing is used to provide complex structural geometry that saves weight while maintaining stiffness and strength. For example, 3D printing provides complex geometries with undercuts, voids, and overall complex structures to achieve, compared to traditional cast or stamped pieces, lighter weights with better strength and stiffness. Preferably, the pocket 701 within the 3D printed material 801 defines a seamless enclosure of void space 807.

The void space 807 is disposed between a front wall 813 and a back wall 819 of the ball-striking face 627. The ball-striking face 627 further includes one or more posts 705 that extend across the void space 807 from the front wall 813 to the back wall 819. In preferred embodiments, the ball-striking face 627 includes a plurality of posts 705 of differing cross-sectional thicknesses such as, e.g., thick post 827 and thin post 829. It may be preferable to locate the thicker posts close to a geometric center of the ball striking face 627. In some embodiments, all or a substantial portion of the ball striking face 627 has a first thickness T1. The center of the face, being subject to the most high-impact ball strikes, may be given a bulge or pad conferring a second thickness T2 on the center of the face (pad meaning raised area). In certain embodiments, at least one central thick post 827 near a center of the ball-striking face 627 is more than twice as thick as at least a peripheral thin post 829 across the void space 807.

In some embodiments, the 3D printed material 801 fully encloses the void space 807, leaving no fluid communication between the void space and an exterior of the golf club head. Most preferably, the material 801 provides a monolithic, seam-free enclosure surrounding the void space 807.

Due to the geometry by which a part is fashioned via additive manufacturing methods such as FFF, DMLS, or ADAM, parts can be made that have topologies or shapes that are generally unobtainable by molding, forging, casting, or stamping. For example, a metal piece may be made that has an internal void space within a solid piece of metal. Additive manufacturing may be used to form a solid metal Mobius strip or Klein bottle. Additive manufacturing may be used to form a topology such as a torus, a trefoil knot, or linked chain-links of solid metal, to give examples. Thus additive manufacturing can be used to make a golf club part that includes one or more of internal void space(s), flying struts or posts, lattice-like structures, structures with arbitrary porosities, discrete structures enclosed in surrounding structures (e.g., within voids or in cages), as well as any other structure with any designed or arbitrary regular or irregular patterns of void spaces. Additionally, additive manufacturing may provide a convenient way to provide useful surface patterns or textures such as surfaces with exoskeletons of ridges or ribs, pock-marked surfaces, cratered surfaces, or waffle-iron surfaces. Thus, some embodiments provide a golf club head in which a part is made with a pattern of pockets, grooves, ridges, or hillocks, said pattern being regular or irregular.

Figure 11:
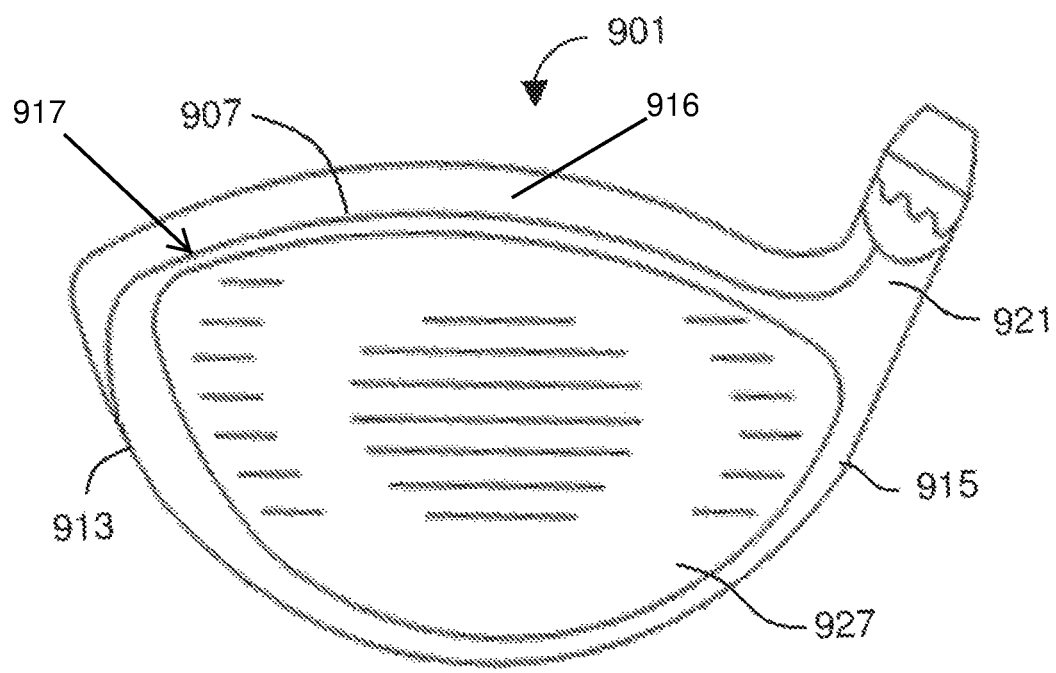
FIG. 11 shows a golf club head with a 3D printed part with a patterned surface.

FIG. 11 shows a golf club head 901 that includes a 3D printed part with a patterned surface. The golf club head 901 includes a hollow club head body 907 defining a toe portion 913 and a heel portion 915, and defining a medial portion 916 extending between the toe portion 913 and the heel portion 915. A hosel 921 extends upward from the heel portion 915 when the club head 901 is at address. The club head 901 further includes a surface-patterned face member 927 that includes an outer or front surface 928 and extends through the medial portion 916 from the toe portion 913 to the heel portion 915, and an internal void 917 (see FIGS. 13 and 14) of the golf club head 901 is enclosed by the face member 927 and the hollow club head body 907.

Figure 12:
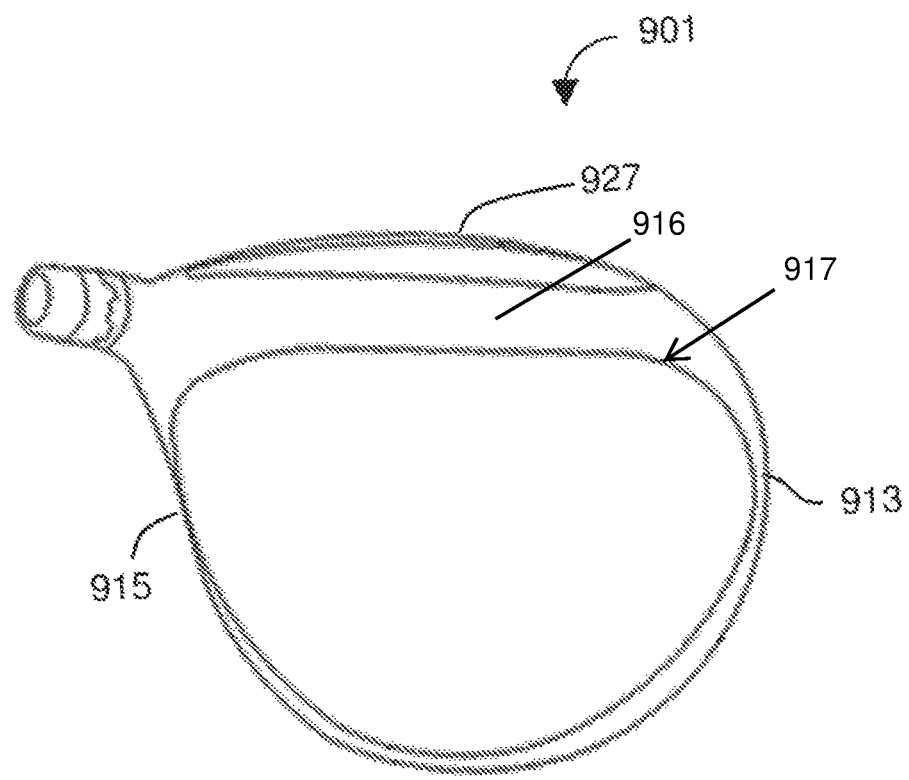
FIG. 12 shows the surface-patterned face member.

FIG. 12 shows the surface-patterned face member 927 disposed between the heel portion 915 and the toe portion 913 and facing forward when the club head 901 is at address. At least a portion of the face member 927 comprises a 3D printed material that presents a surface comprising a network of raised lineaments defining a plurality of recesses.

Figure 13:
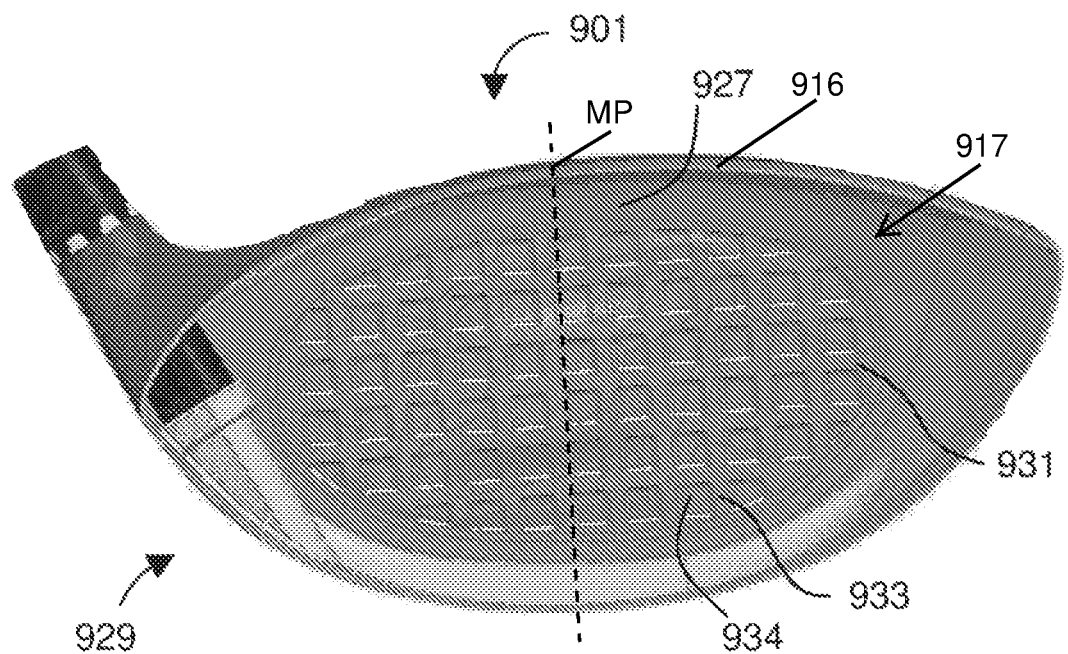
FIG. 13 is a cutaway view of the club head with a patterned surface component.

FIG. 13 is a cutaway view, from behind, of the club head 901 with a patterned surface component. A back surface 931 of the face member 927 includes a network of raised lineaments 933 defining a plurality of recesses 934. In the depicted embodiment, the raised lineaments 933 define a rectilinear grid which may be characterized as defining a waffle iron pattern 929 (e.g., a regular pattern of repeating square recess 934). By including the network of raised lineaments 933, mass is removed but strength is provided. Thus, where the club head 901 is a driver, the patterned surface 931 of the 3D printed face member reduces weight but maintains strength, relative to a face member with smooth surfaces such as may be made by a prior art stamping for forging process.

Figure 14:
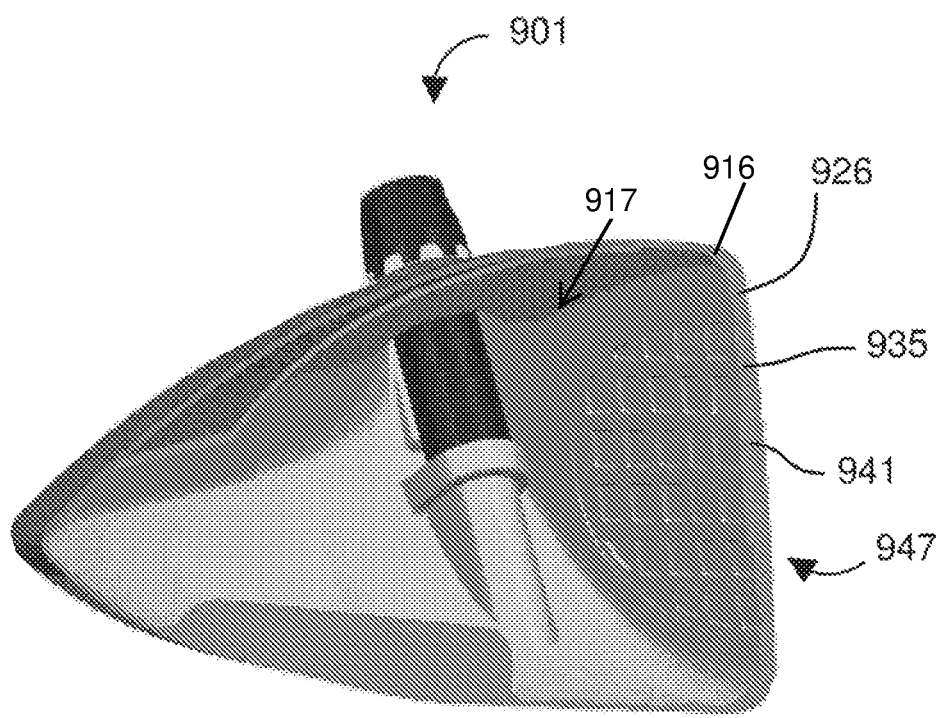
FIG. 14 is a cutaway away view down a medial plane of the club head.

FIG. 14 is a cutaway view down a medial plane MP (see FIG. 13) of the club head 901 with the patterned surface component. It can be seen that the face member 926 is a first thickness over a substantial portion of its area 935. However, the face member 926 includes a second thickness 941 near a center of the face. Specifically, the face member 926 has a rounded rhombus pad 947 over its central area. Thus, the 3D printed face member 926 is formed by adding a waffle pattern 929 on the back of a rounded rhombus pad 947 to provide a very strong structure, with optimized mass, and a high CT. It may be beneficial to highly polish points of the waffle structure.

In club head 901, the raised lineaments 933 define a waffle iron pattern 929, thereby defining a pattern of relief on the patterned surface 931 of the face member 926. Generally, waffle-iron may be understood to include regular or semi-regular patterns of square or rectilinear pockets 934 defined by raised lineaments 933. Other geometries may be provided and used with a 3D printed component of the invention. Some embodiments exploit the insight that a geodesic dome is understood to be a very strong structure for an amount of mass or material used in its making.

Figure 15:
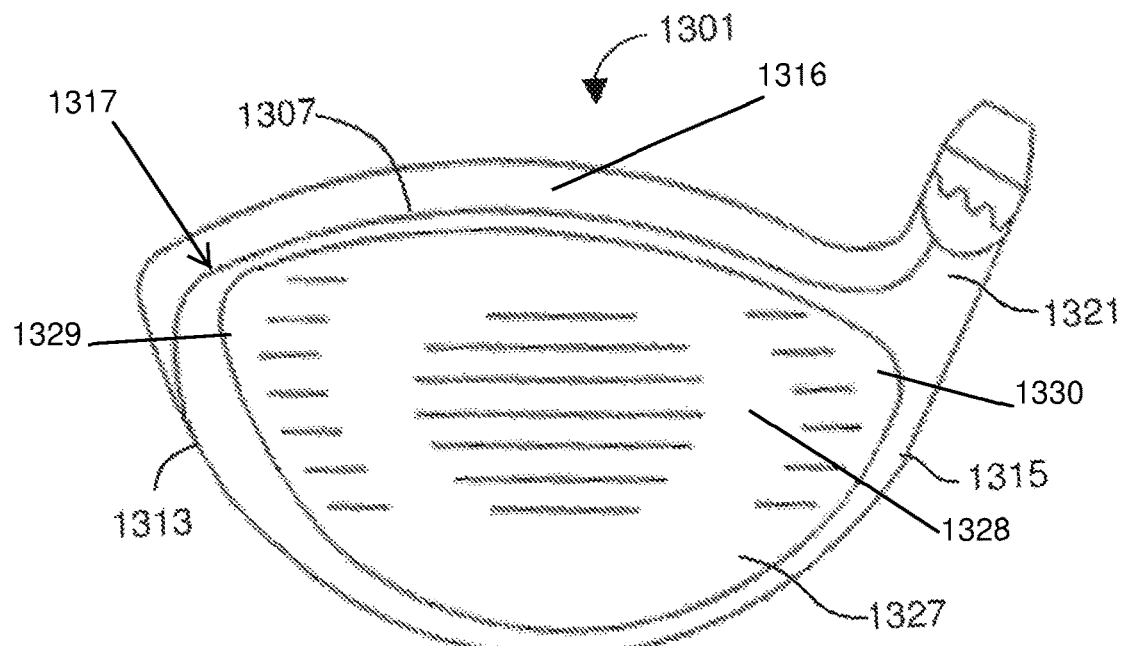
FIG. 15 shows a geodesic golf club head with a geodesic-like face member.

FIG. 15 shows a geodesic golf club head 1301 that includes a hollow club head body 1307 defining a toe portion 1313 and a heel portion 1315, and a medial portion 1316 extending between the toe portion 1313 and the heel portion 1315. A hosel 1321 extends upward from the heel portion 1315 when the club head 1301 is at address. The club head 1301 further includes a face member 1327 that includes an outer or front surface 1328 and extends through the medial portion 1316 from a toe end 1329 at the toe portion 1313 to a heel end 1330 at the heel portion 1315, and the face member 1327 includes a 3D printed material that presents a geodesic-like structural pattern into an internal void 1317 of the golf club head 1301, with the internal void 1317 being enclosed by the face member 1327 and the hollow club head body 1307.

Figure 16:
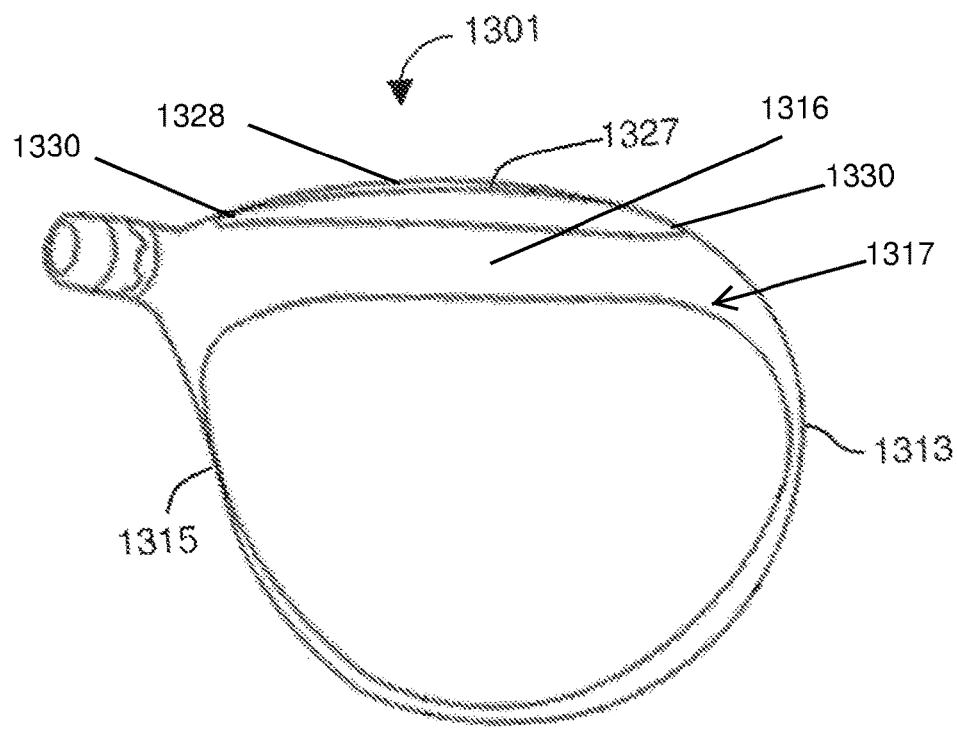
FIG. 16 is a top view of the geodesic golf club head.

FIG. 16 is a top view of the geodesic golf club head 1301. The top view shows the face member 1327 disposed in the medial portion 1316 and extending between the heel portion 1315 and the toe portion 1313 and the outer surface 1328 facing forward when the geodesic club head 1301 is at address.

Figure 17:
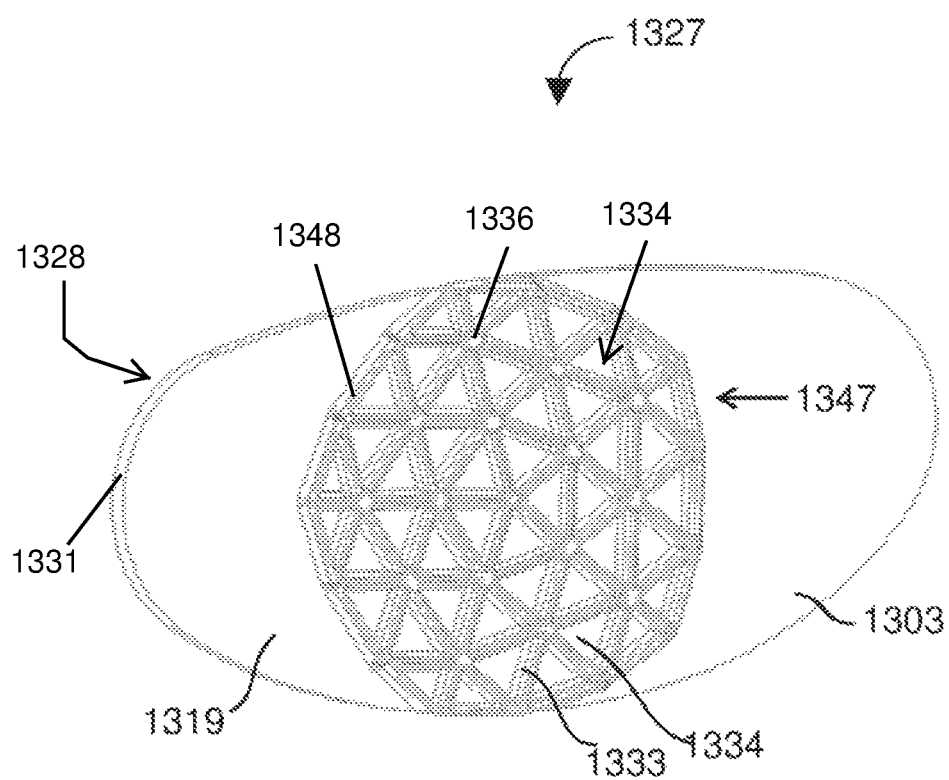
FIG. 17 shows the geodesic-like face member.

FIG. 17 shows the geodesic-like face member 1327, which is made from a 3D printed material 1319 and defines an outer periphery 1331. An inside surface or rear inner surface 1303 of the face member 1327 is disposed opposite the front surface 1328, such that the outer periphery 1331 extends between the outer surface 1328 and the inside surface 1303, and the inside surface 1303 faces rearwardly toward the internal void 1317 enclosed in the hollow club head body 1307 (see FIG. 16) into which the inside surface 1303 presents a geodesic-like structural pattern 1347. The geodesic-like structural pattern 1347 is provided in the form of a portion of the face member 1327 in which the 3D printed material exhibits a network of raised lineaments or web of ribs 1333 defining a plurality of recesses 1334 along the inside surface 1303 and a plurality of intersections 1336 extending rearwardly from the inside surface 1303. To aid in visualizing the face member 1327, other views are presented.

Figure 18:
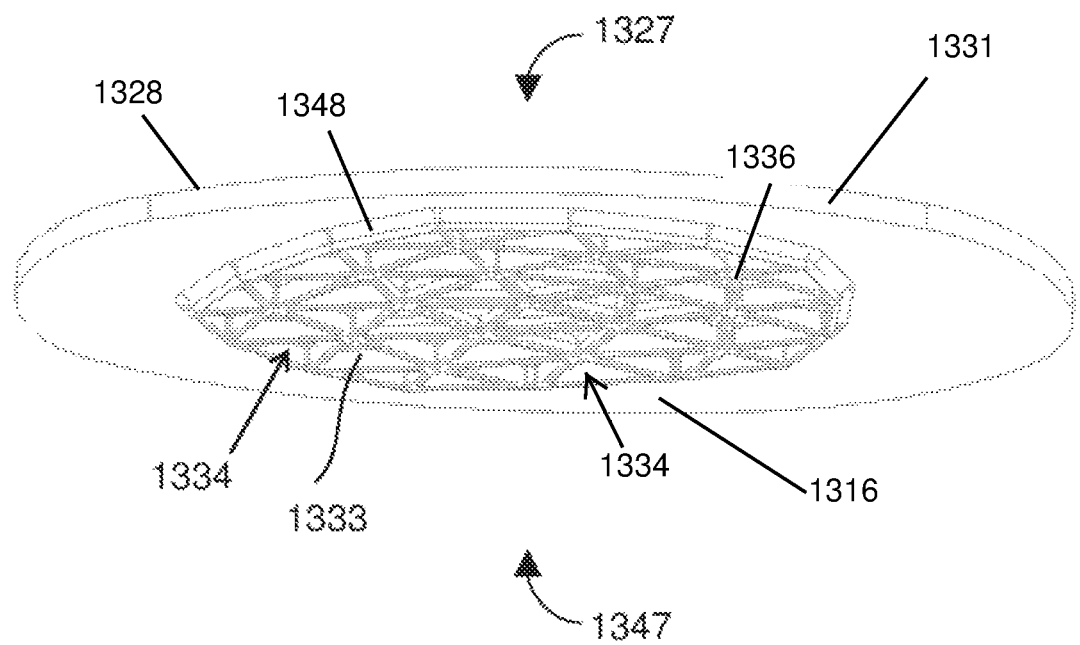
FIG. 18 is a top-down perspective view of the geodesic face member.

FIG. 18 is a top-down perspective view of the geodesic-like face member 1327 showing that the geodesic-like structural pattern 1347 is provided by the network of raised lineaments 1333 defining the plurality of recesses 1334. The plurality of recesses 1334 are bordered or surrounded by at least three lineaments 1333, such that the plurality of recesses 1334 are substantially triangular-shaped.

Figure 19:
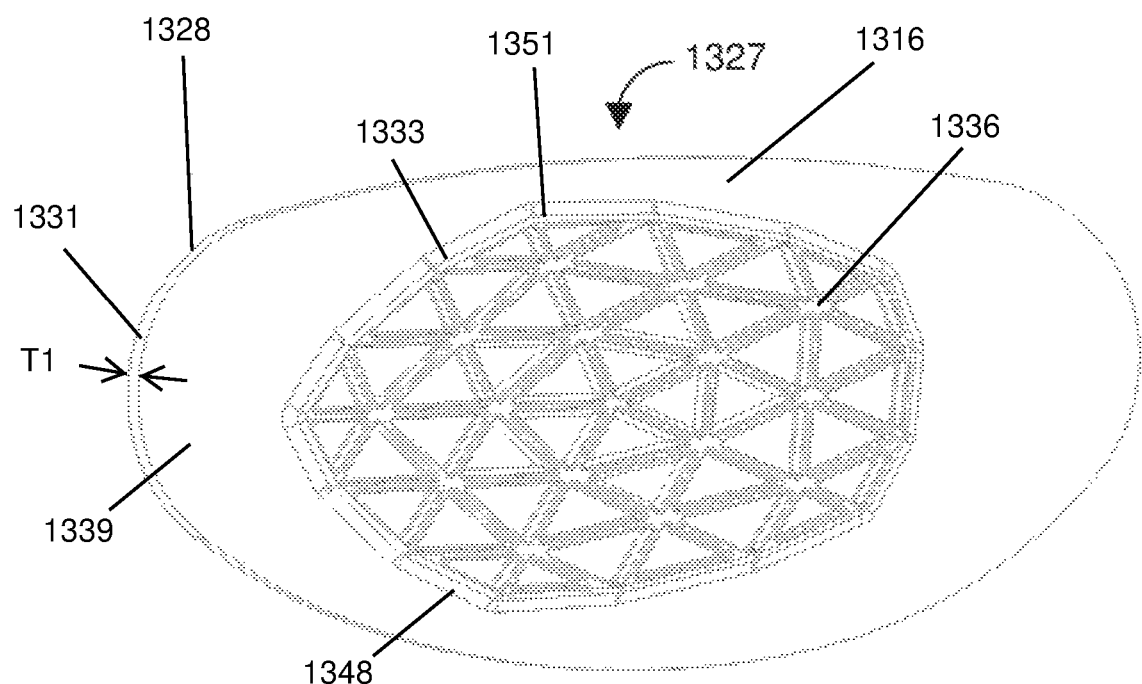
FIG. 19 is an angled view of the geodesic face member.

FIG. 19 is an angled view of the geodesic-like face member 1327.

Figure 20:
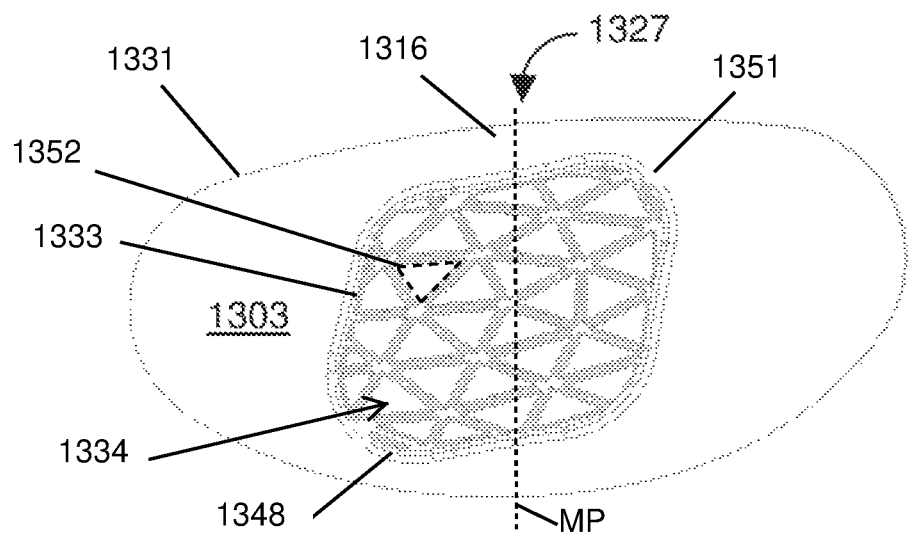
FIG. 20 is a view of an inside surface of the geodesic face member.
Figure 21:
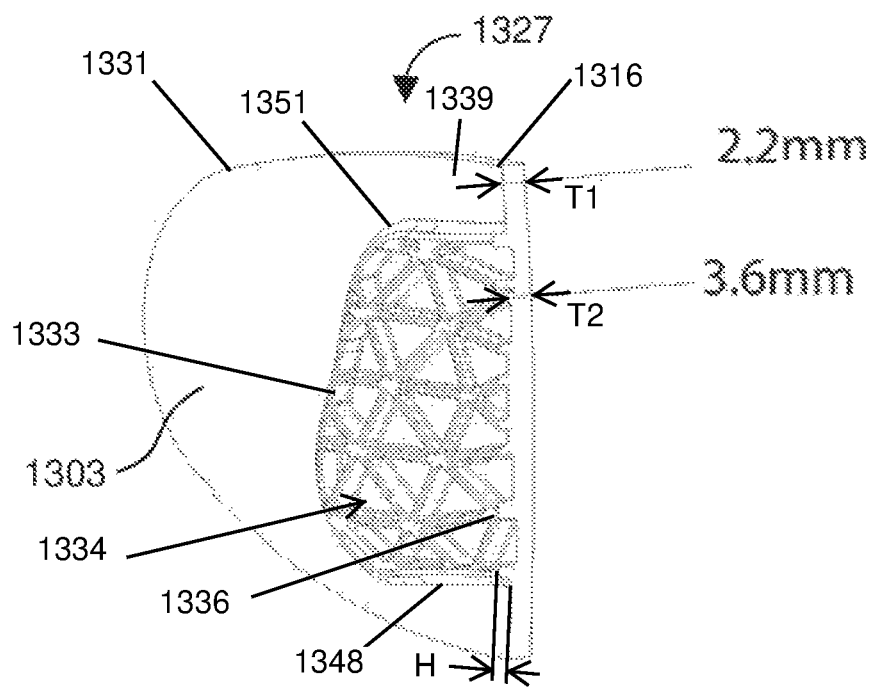
FIG. 21 is a cross-sectional view through the geodesic-like face member.
Figure 22:
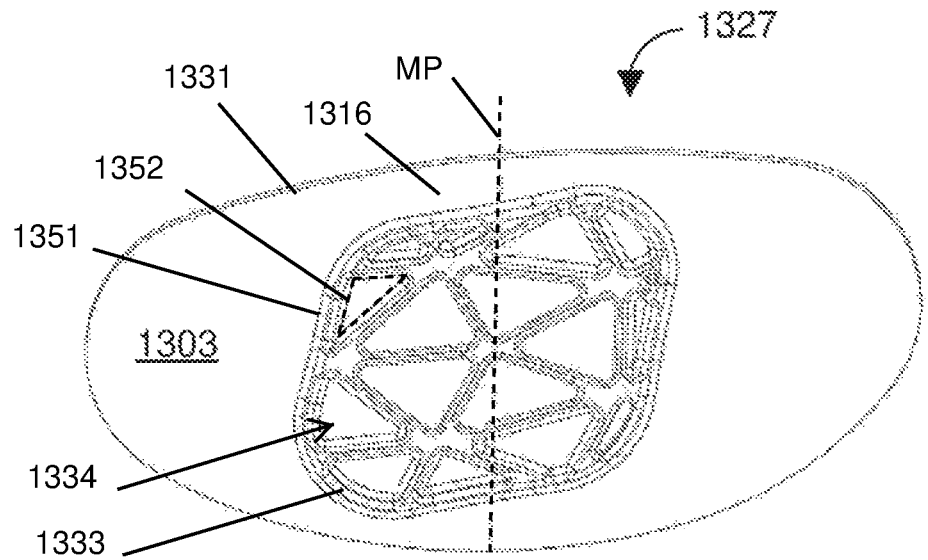
FIG. 22 is a view of an inside surface of the geodesic face member illustrating another geodesic pattern.

FIGS. 20 and 22 are views looking directly at an inside surface 1303 of the geodesic-like face member 1327. As shown, a predominant, first portion 1339 of the face member 1327, underlying the inside surface 1303 has a first thickness T1, as illustrated in FIG. 19. The geodesic-like structural pattern 1347 including the raised lineaments 1333 forms a second portion 1348 having a second thickness T2 (see FIG. 21) and extending outwardly from the medial region 1316 to a boundary 1351 between the first portion 1339 and the second portion 1348, functionally similar to a thickened portion such as an elliptical or rhombus (rounded) pad lifted from the back or inside surface 1303 of the face member 1327 (pad can be understood as referring to a raised platform or thickened area and does not require soft or flexible padding). The geodesic-like structural pattern 1347 defines the boundary 1351 to be arranged inwardly from the outer periphery 1331 and thus underlies and reinforces an impact area of the face member 1327 that is positioned within the medial portion 1316 and intersected by a medial plane MP (see FIGS. 20 and 22), which extends in a front-back direction into and out of the page, that is positioned centrally between the heel end 1330 and the toe end 1329 (see FIG. 15) of the face member 1327; consequently, the second portion 1348, which coincides with the impact area, is subject to the most frequent high power golf ball hits. The raised lineaments 1333 define the plurality of intersections 1336 to be disposed inwardly of the boundary 1351 relative to the outer periphery 1330 of the face member 1327, such that the first portion 1339 forms an uninterrupted region, where no ribs are present, between the outer periphery 1331 and the boundary 1351.

Figure 23:
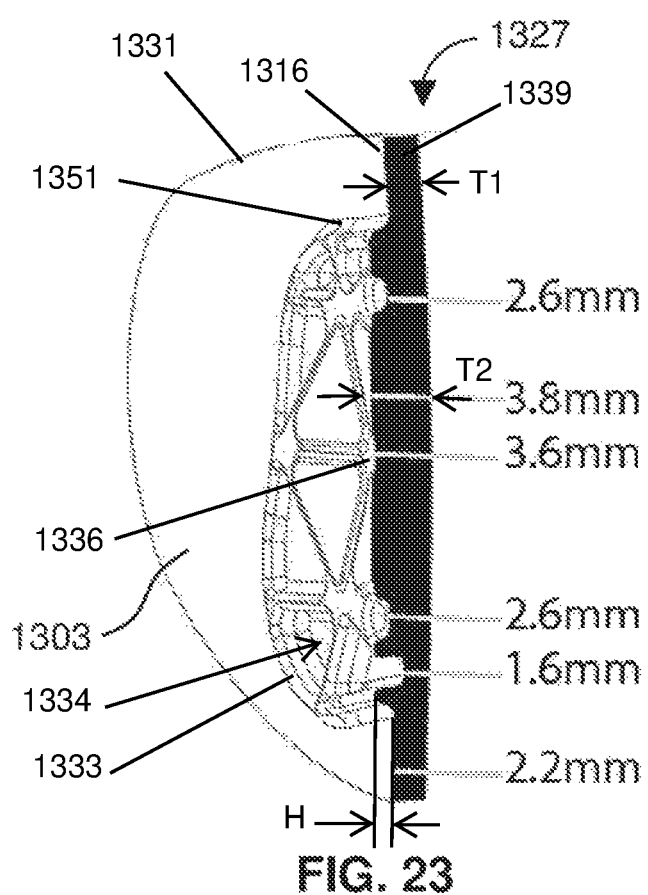
FIG. 23 is a cross-sectional view through the geodesic-like face member.

FIGS. 21 and 23 are cross-sectional views through the geodesic-like face member 1327 of the geodesic golf club head 1301, illustrating an amount of relief provided by the raised lineaments 1333. The face member 1327 has a predominant first thickness T1 of about 2.2 mm, as illustrated in FIG. 21. The raised lineaments 1333 sit proud of the inside surface 1303 of the face member 1327 and increase that thickness of the face member 1327 to a second thickness T2 of about 2.6 mm or about 3.6 mm. Thus the lineaments 1333 can be understood to include raised ridges or ribs of between about 1 and 2 mm in height H, i.e., a distance from the inside surface 1303 in the front-rear direction, and at least partially define the second thickness T2 of the second portion 1348. Accordingly, the lineaments 1333 define the plurality of intersections 1336 to vary in height H along the inside surface 1303, such that one intersection 1336 may extend a first height and another intersection 1336 may extend a second height that is different, i.e., greater or smaller, than the first height. It can be seen that the raised lineaments 1333 define a portion of a geodesic polyhedron, and in some embodiments, the club head 1301 is described as having a geodesic face or face structure with a geodesic-like structural pattern 1347 that provides the face member 1327 with remarkable strength and light weight.

In the depicted embodiment then, the raised lineaments 1333 define a plurality of triangles 1352 (see FIGS. 20 and 22) that are interconnected to one another among the plurality of intersections 1336 and surround or border the triangular-shaped plurality of recesses 1334. Triangles may be understood to have exceptional strength against shearing forces as compared to other polygons with parallel sides as for a triangular polygon to deform under shear stress requires compression or lengthening of one of the linear sides whereas deformation of a rectangular or rhombus polygon under shear stress only requires increasing or decreasing joint angles with no change in edge length. I.e., a rectangle or rhombus can fold closed within its Euclidean plane with only changes to its joint angles but a triangle can only fold closed within its Euclidean plane by changing a length of one or more side edges. For at least such reasons, geodesic domes are very strong structures because they combine arcs and triangles in a spherical fashion to distribute loads as efficiently as possible. The ball striking face or outer surface 1328 of a driver, i.e., of the face member 1327, may include a bulge, roll, or both that may be considered to approximate a section of a much larger sphere or spheroid. Here, the face member 1327 includes a geodesic dome-like face pad (i.e., a raised area of additional, reinforcing material) reinforcing the face in about an area of maximal number of force of golf ball strikes. By constructing the face pad to approximate geodesic dome geometry, the club head 1301 has necessary support in the center of the face while also reducing overall mass/weight of the face of the golf club.

Golf club heads 101, 601, 901, 1301 of the present invention may be provided as a component of a golf club that has a lightweight but very durable 3D printed face.

Figure 24:
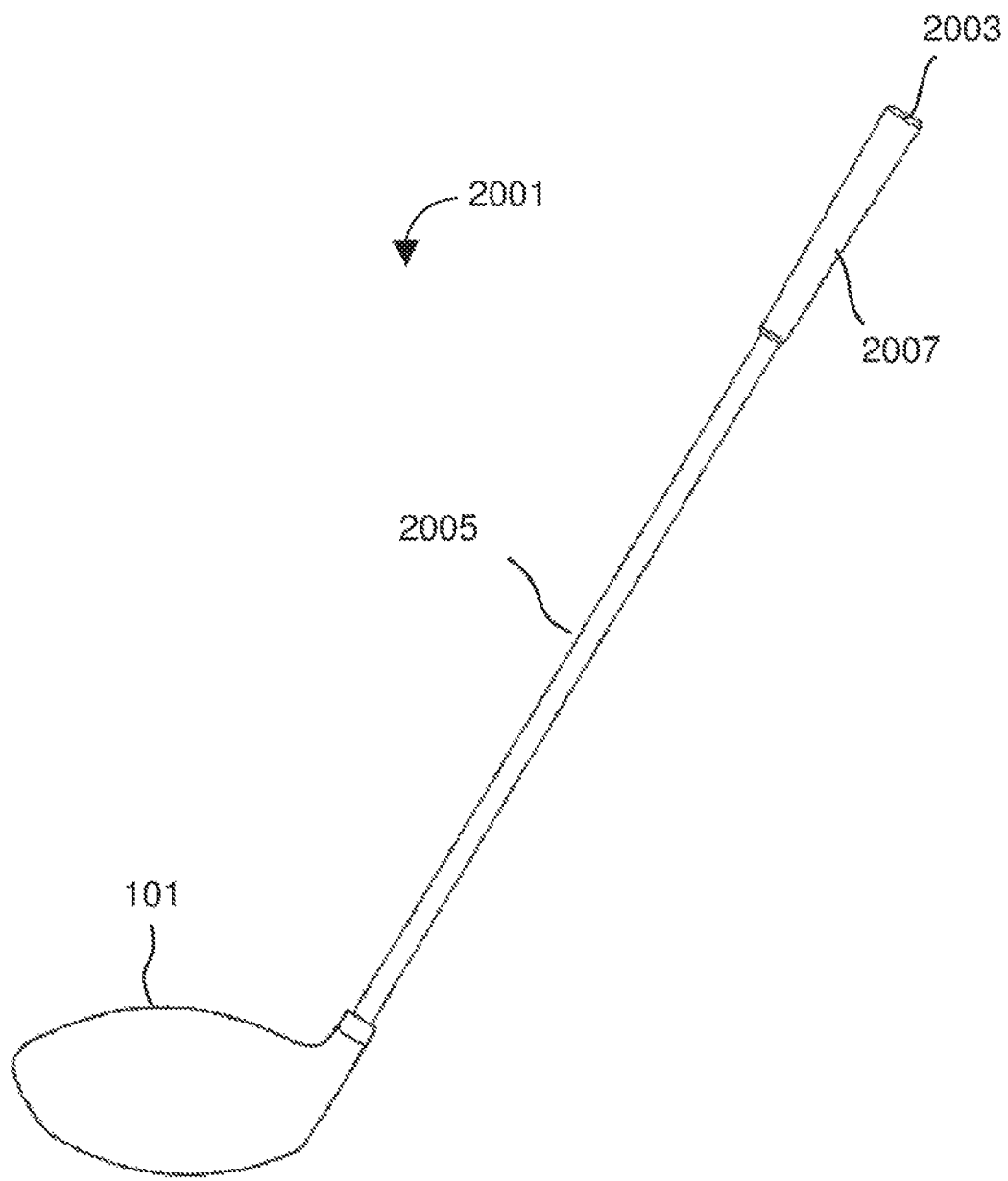
FIG. 24 shows a golf club according to the disclosure.

FIG. 24 shows a golf club 2001 of the invention. The golf club includes a golf club head 101, 601, 901, 1301 attached to a distal end of a shaft 2005 via a hosel. The golf club 2001 also includes a grip 2007 attached to a proximal end of the shaft 2005 and terminating at a butt end 2003 of the grip 2007. Embodiments of the invention also provide methods of making a golf club head that includes a 3D printed face.

Figure 25:
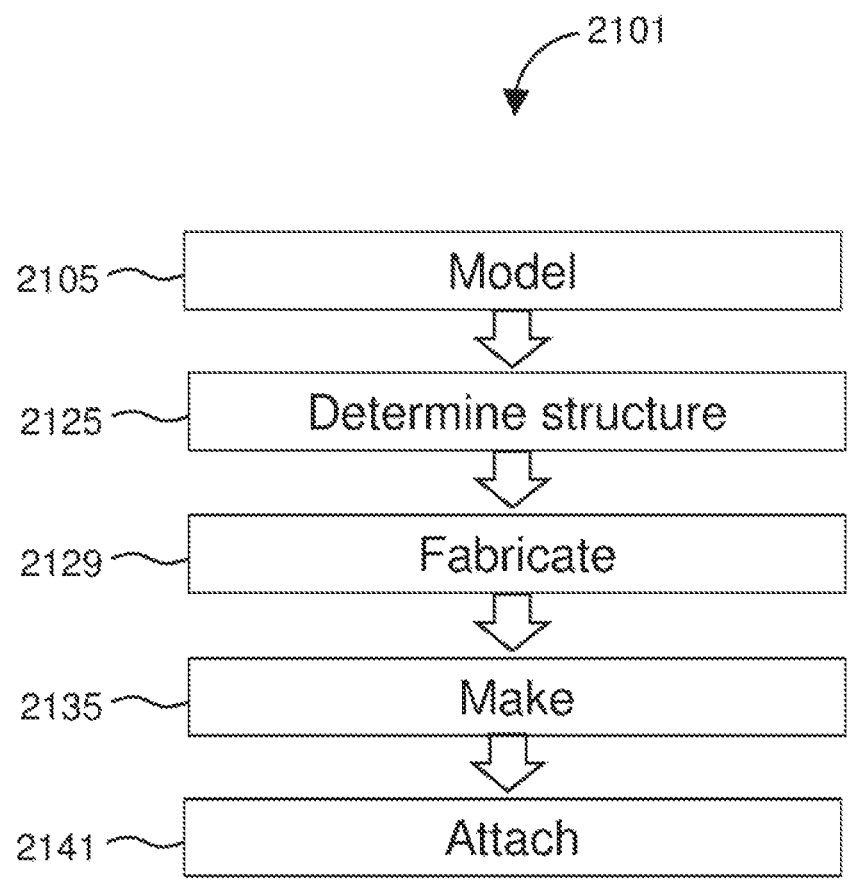
FIG. 25 diagrams a method of making a golf club head.

FIG. 25 diagrams a method 2101 of making a golf club head 101, 601, 901, 1301 of the present disclosure. The method includes providing a model 2105 of the golf club head as, for example, an *.stl file in modeling software. A portion of the ball-striking face is given a structure that is determined 2125 to decrease mass and exhibit strength through the use of a complex structure such as flying posts, interior voids, or raised lineaments that is a 3D printed part of the face. The ball striking face is fabricated 2129 by 3D printing. Preferably, FFF, DSML, or ADAM is used. The 3D printing method can create seamless transitions from a first metal to a second metal. The method 2101 includes making 2135 other components of the club such as a body with crown and sole and hosel. In some embodiments, a first body member is created that includes the sole, a frame surrounding the ball-striking face, a hosel, and a mounting edge for a crown. A crown member is separately made, and will be bound to the mounting edge of the first body member.

In such embodiments, it may be preferable to have the first body member be monolithically formed of a first metal. For example, the first body member may be a single casting in titanium or stainless steel. The first body member includes the sole, the hosel, the mounting edge for a crown, and the frame surrounding the ball-striking face. The frame refers to a knock-out or void space, i.e., a cutaway, shaped as the complement to the face member. That cutaway may include a mounting ledge, tab(s), or cantilevered positioning reminders to aid in positioning the face member when it is welded in. The crown member may preferably be made of a lightweight thermoplastic material, carbon fiber, composite, or other such lightweight material. In some embodiments, a portion of the face member is 3D printed from a metal such as aluminum, titanium, or steel. For example, an *.stl file is provided by modeling 2105 a ball-striking face according to face member 127, 627, 927, 1327 using a CAM platform such as the 3D modeling and design platform sold under the trademark SOLIDWORKS by Dassault Systemes (Waltham, Mass.).

In the most preferred embodiment, the face member 127, 627, 927, 1327 represented by the *.stl file is made by atomic diffusion additive manufacturing using a 3D printing instrument such as that sold under the trademark METAL X by Markforged (Watertown, Mass.). The resultant face member 127, 627, 927, 1327 is placed in the cutaway in the first body member and welded into place. The lightweight crown member is then attached 2141 to the bonding edge of the first body member using an adhesive such as an epoxy resin. By those steps, the club head is formed, after which any variety of finishing steps may be performed including painting, application of decals and/or a clear-coat, etc. Thus is provided a golf club head with a 3D printed face that is lightweight, very strong, and has a high characteristic time.

FIGS. 26-34 show face members with structural supports. Structural supports are face features that protrude into the interior of the golf club head to aid in distributing the stress of a golf ball impact to provide acceptable durability, improve ball performance, and reduce the weight of the face insert. The unique feature of these structural supports include the cross holes and/or voids in their construction (i.e., flying supports).

Figure 26:
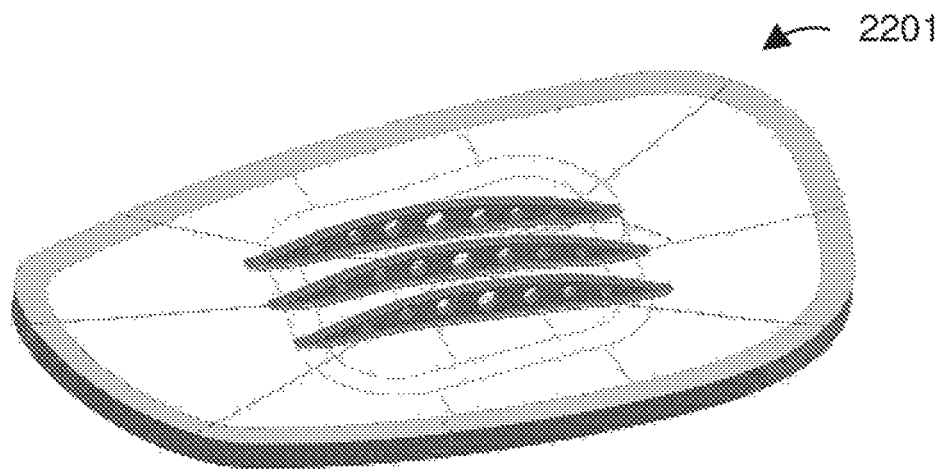
FIG. 26 shows a face member with holes through a support.

FIG. 26 shows a face member 2201 with protruding structural supports from the face insert into the interior of the club head. Structural supports on the interior of a golf club face insert (note the holes through the support).

Figure 27:
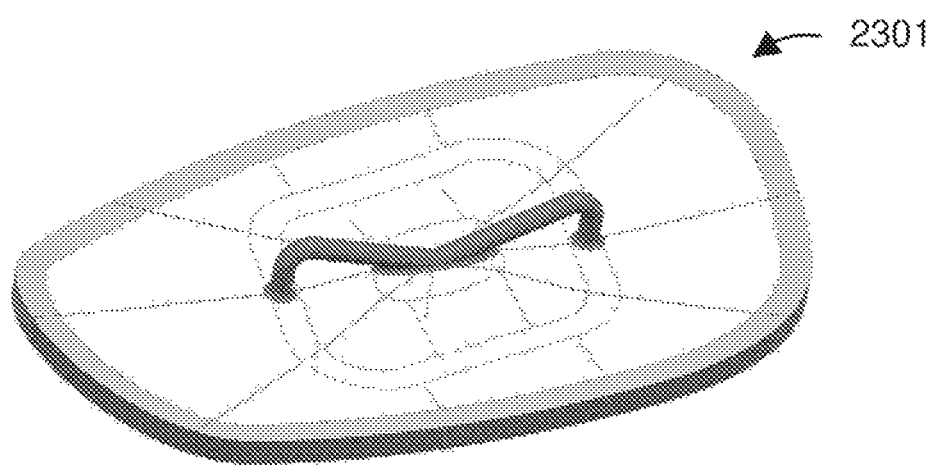
FIG. 27 shows a face member with protruding structural supports.

FIG. 27 shows a face member 2301 with protruding structural supports from the face insert into the interior of the club head. The face member 2301 is shown with a 2-arm structural support.

Figure 28:
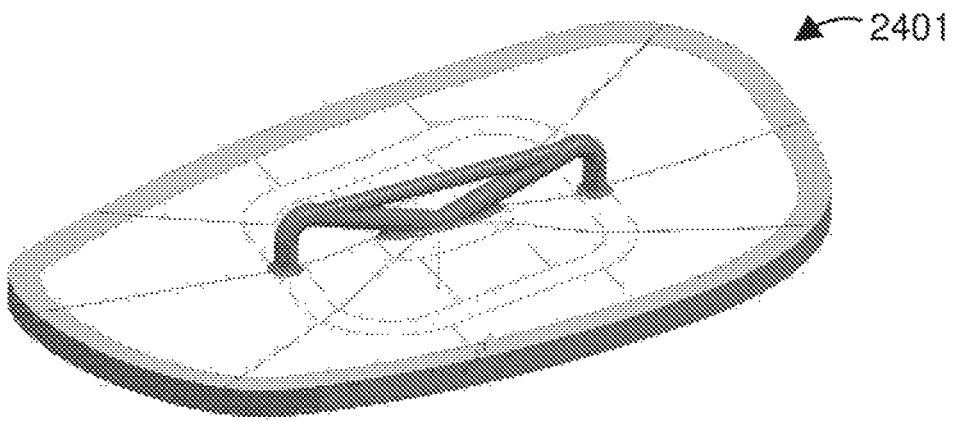
FIG. 28 shows a third embodiment of a face member with protruding structural supports.

FIG. 28 shows a third embodiment of a face member 2401 with protruding structural supports from the face insert into the interior of the club head. The face member 2401 has a 2-arm structural support with cross member.

Figure 29:
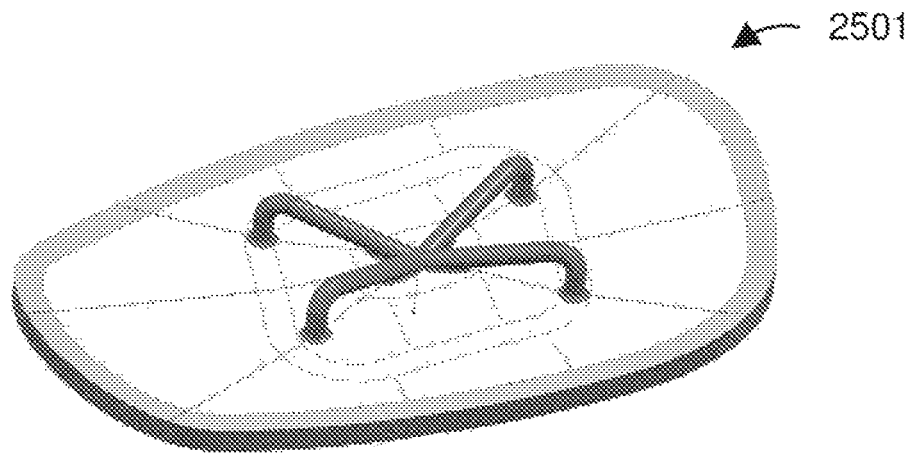
FIG. 29 shows a fourth embodiment of a face member.

FIG. 29 shows a fourth embodiment of a face member 2501 with protruding structural supports from the face insert into the interior of the club head. The face member 2501 has (4) arms, 60 degree spreads.

Figure 30:
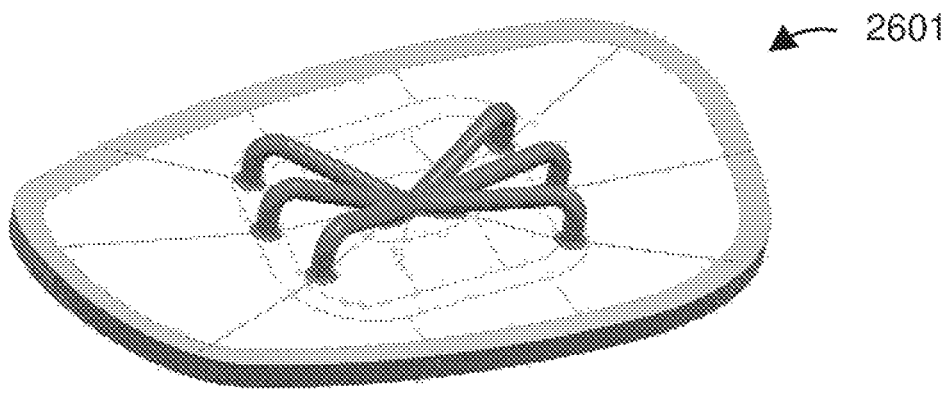
FIG. 30 shows a fifth embodiment of a face member with protruding supports.

FIG. 30 shows a fifth embodiment of a face member 2601 with protruding structural supports from the face insert into the interior of the club head. The face member 2601 is shown with (6) arms, 30 degree spreads.

Figure 31:
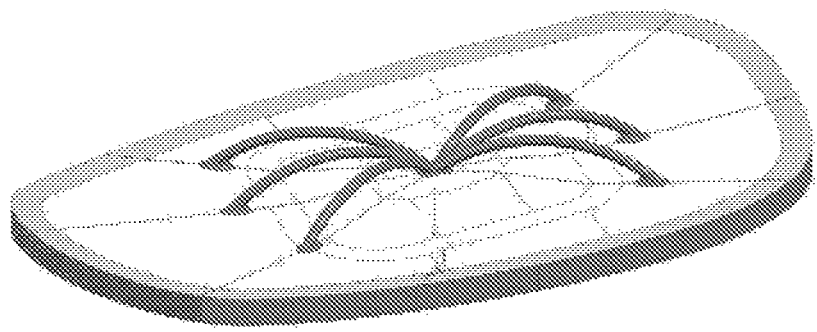
FIG. 31 shows a sixth embodiment of a face member.

FIG. 31 shows a sixth embodiment of a face member 2701 with protruding structural supports from the face insert into the interior of the club head. The face member 2701 is provided with (6) curved arms, 30 degree spreads.

Figure 32:
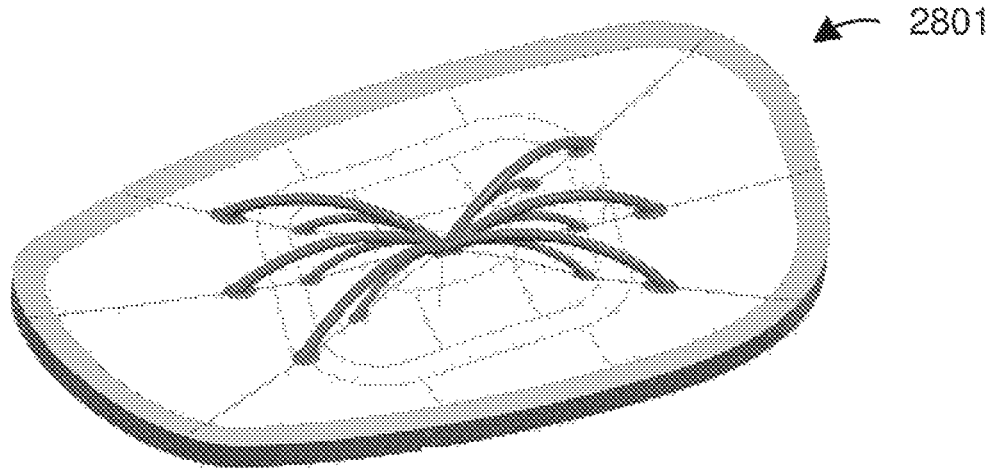
FIG. 32 shows a face member with 12 arms.

FIG. 32 shows a seventh embodiment of a face member 2801 with protruding structural supports from the face insert into the interior of the club head. The face member 2801 is shown with 12 arms, 30 degree spreads.

Figure 33:
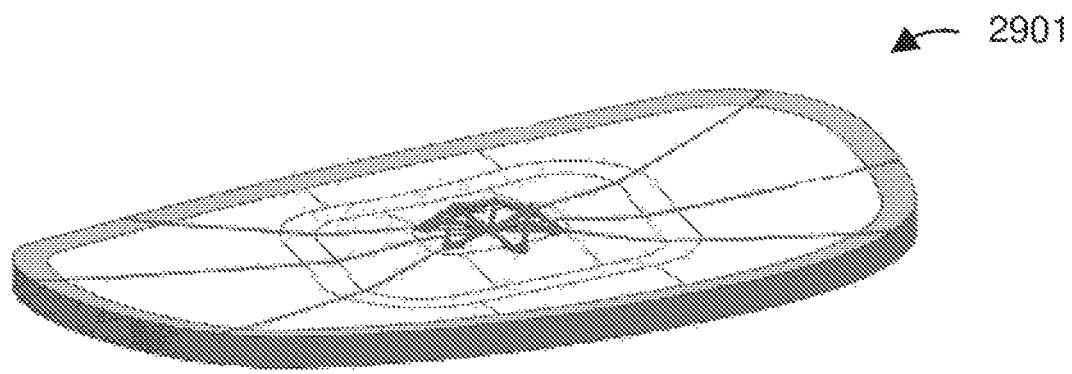
FIG. 33 shows an eight embodiment of a face member.

FIG. 33 shows an eighth embodiment of a face member 2901 with protruding structural supports from the face insert into the interior of the club head. This is a 3D structural support.

Figure 34:
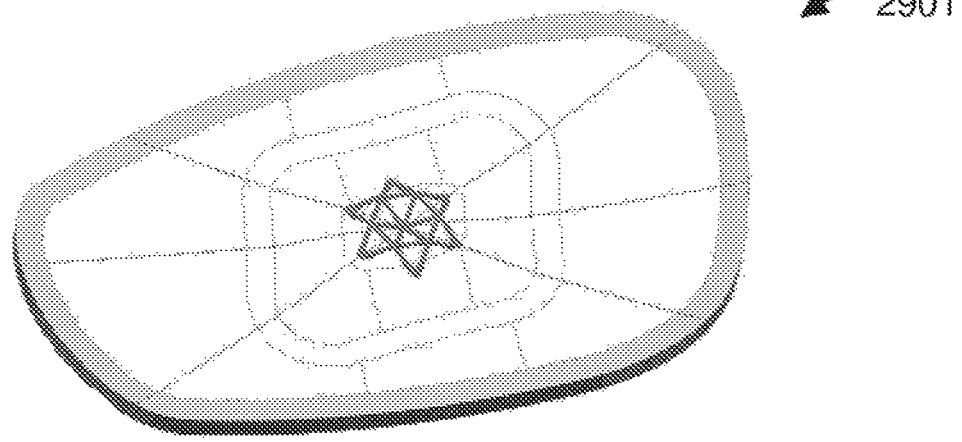
FIG. 34 shows the eight embodiment of the face member.

FIG. 34 shows the eighth embodiment with the 3D face member 2901 with structural supports that can be designed in any polyhedron shape and pattern to obtain the desired look and stress bearing properties desired.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A golf club head comprising:
    a hollow club head body defining a heel portion and a toe portion;
    a hosel extending upward from the heel portion when the golf club head is at address; and
    a unitary face member disposed between the heel portion and the toe portion, the unitary face member including an outer surface and an inner surface that is disposed rearwardly of and opposite the outer surface, the inner surface and the hollow club head body defining an internal void of the golf club head, the inner surface defining a heel end arranged adjacent to the heel portion and a toe end arranged adjacent to the toe portion, and including a web of ribs integrally connected to the inner surface and extending rearwardly from the inner surface into the internal void,
    the web of ribs extending along the inner surface and defining a boundary that is arranged inwardly from the heel end and the toe end, so that the inner surface defines an uninterrupted region, where no ribs are present, between the toe end and the boundary and between the heel end and the boundary, and wherein the web of ribs includes a plurality of intersections at which at least three ribs of the web of ribs are joined, one intersection of the plurality of intersections being positioned rearwardly of the inner surface and extending a first distance from the inner surface, and another intersection of the plurality of intersections being positioned rearwardly of the inner surface and extending a second distance from the inner surface, wherein the second distance is smaller than the first distance, and wherein the boundary comprises a plurality of ribs connected to one another to form a curvilinear perimeter that extends continuously along the inner surface and extends rearwardly from the inner surface.

2. The golf club head of claim 1, wherein at least one rib of the web of ribs extends from a first point on the inner surface to a second point on the inner surface, wherein at least a portion of the at least one rib is spaced away from the inner surface of the unitary face member.

3. The golf club head of claim 1, wherein the web of ribs extends normally from the inner surface.

4. The golf club head of claim 1, wherein the web of ribs and the inner surface define a recess.

5. The golf club head of claim 1, wherein the unitary face member is formed of a first metal and the web ribs are formed of a second metal.

6. A golf club head comprising:
    a hollow club head body defining a heel portion and a toe portion;
    a hosel extending upward from the heel portion when the club head is at address; and
    a unitary face member disposed between the heel portion and the toe portion, the unitary face member including an outer surface and an inner surface that is disposed rearwardly of and opposite the outer surface, the inner surface and the hollow club head body defining an internal void enclosed in the golf club head, the unitary face member defining an outer periphery and a first portion having a first thickness,
    the inner surface defining a heel end arranged adjacent to the heel portion, a toe end arranged adjacent to the toe portion, and a medial region arranged between the heel end and the toe end, wherein the inner surface includes a plurality of interconnected ribs integrally connected to the inner surface of the unitary face member and extending rearwardly into the internal void to form a second portion having a second thickness that is greater than the first thickness, and wherein the plurality of interconnected ribs extend outwardly from the medial region to a boundary that is between the first portion and the second portion and arranged inwardly from the heel end and the toe end, wherein the interconnected ribs form a plurality of intersections that are disposed inwardly of the boundary and spaced apart from one another, and wherein the inner surface of the first portion defines an uninterrupted region, where no ribs are present, between the boundary and the outer periphery, and wherein the boundary comprises a plurality of ribs connected to one another to form a curvilinear perimeter that extends continuously along the inner surface and extends rearwardly from the inner surface.

7. The golf club head of claim 6, wherein at least one of the plurality of interconnected ribs is arcuate.

8. The golf club head of claim 6, wherein the plurality of interconnected ribs include a first rib and a second rib integrally connected to and extending from the inner surface.

9. The golf club head of claim 8, wherein the first rib and the second rib are connected to one another.

10. The golf club head of claim 8, wherein the first rib and the second rib are aligned with one another.

11. The golf club head of claim 8, further comprising a third rib integrally connected to and extending from the first rib and the second rib, the first rib, the second rib, and the third rib defining a triangular-shape.

12. The golf club head of claim 8, wherein the first rib and the second rib vary in height from one another relative to the inner surface.

13. A golf club head comprising:
a hollow club head body defining a heel portion and a toe portion;
a hosel extending upward from the heel portion when the club head is at address; and
a unitary face member disposed between the heel portion and the toe portion and connected to the hollow club head body, the unitary face member including an outer surface, and an inner surface that is disposed rearwardly of and opposite the outer surface that defines an outer periphery, the inner surface and the hollow club head body defining an internal void of the golf club head,
the inner surface defining a heel end arranged adjacent to the heel portion, a toe end arranged adjacent to the toe portion, and a medial region arranged between the heel end and the toe end, wherein a web of ribs is integrally connected to the inner surface and extends rearwardly from the inner surface into the internal void, and
wherein the web of ribs extends outwardly from the medial region to a boundary between a first portion of the unitary face member having a first thickness and a second portion of the unitary face member having a second thickness, wherein the web of ribs includes at least three ribs extending from an intersection in three different directions relative to one another, and wherein the first portion defines an uninterrupted region, where no ribs are present, between the outer periphery and the boundary, and wherein the boundary comprises a plurality of ribs connected to one another to form a curvilinear perimeter that extends continuously along the inner surface and extends rearwardly from the inner surface.

14. The golf club head of claim 13, wherein a plurality of recesses are defined by the web of ribs and the inner surface.

15. The golf club head of claim 13, wherein the boundary defines the curvilinear perimeter around the web of ribs.

* * * * *